(12) United States Patent
Picard et al.

(10) Patent No.: US 12,006,385 B2
(45) Date of Patent: *Jun. 11, 2024

(54) COMB POLYMER

(71) Applicants: COMMISSARIAT A L'ENERGIE ATOMIQUE ET AUX ENERGIES ALTERNATIVES, Paris (FR); UNIVERSITE GRENOBLE ALPES, Saint-Martin D'Heres (FR); CENTRE NATIONAL DE LA RECHERCHE SCIENTIFIQUE, Paris (FR)

(72) Inventors: Lionel Picard, Grenoble (FR); Thomas Clement, Grenoble (FR); Patrice Rannou, Grenoble (FR)

(73) Assignees: COMMISSARIAT A L'ENERGIE ATOMIQUE ET AUX ENERGIES ALTERNATIVES, Paris (FR); UNIVERSITE GRENOBLE ALPES, Saint-Martin d'Heres (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 16 days.

This patent is subject to a terminal disclaimer.

(21) Appl. No.: 17/175,058

(22) Filed: Feb. 12, 2021

(65) Prior Publication Data

US 2021/0253760 A1  Aug. 19, 2021

(30) Foreign Application Priority Data

Feb. 14, 2020 (FR) .................................. 20 01490

(51) Int. Cl.
  *C08F 214/18* (2006.01)
  *C08F 257/02* (2006.01)
  (Continued)

(52) U.S. Cl.
  CPC ........ *C08F 214/182* (2013.01); *C08F 257/02* (2013.01); *C08G 64/1608* (2013.01); *H01M 10/0565* (2013.01)

(58) Field of Classification Search
  None
  See application file for complete search history.

(56) References Cited

U.S. PATENT DOCUMENTS 4,357,401 A   11/1982 Andre et al.
2020/0280094 A1   9/2020 Bernardo et al.

FOREIGN PATENT DOCUMENTS

EP            0 037 776 A1   10/1981
WO    WO 2019/053388 A1    3/2019

OTHER PUBLICATIONS

Oliva, M. et al. "PDMS-based films containing surface-active amphiphilic block copolymers to combat fouling from barnacles B. amphitrite and B. improvisus". Polymer 2017, 108, 476-482. (Year: 2017).*

(Continued)

*Primary Examiner* — Richard A Huhn
(74) *Attorney, Agent, or Firm* — Oblon, McClelland, Maier & Neustadt, L.L.P.

(57) ABSTRACT

The present invention relates to a comb polymer comprising a main chain formed from 1-ethenyl- and/or 1-allyl-2,3,4,5,6-pentafluorobenzene monomers and polymeric side chains grafted in the para position of the pentafluorophenyl groups, in which said polymeric side chains are linked to said main chain by an oxygen atom, the molar grafting rate of polymeric side chains being greater than or equal to 50%. It also relates to a method for the preparation of such a comb polymer.

16 Claims, 11 Drawing Sheets

(51) Int. Cl.
*C08G 64/16* (2006.01)
*H01M 10/0565* (2010.01)

(56) References Cited

OTHER PUBLICATIONS

Ma, J. et al., "Well-Defined Multifunctional Fluorocopolymers: Having Both Amphiphilic Structure and Reactive Sites". Polymer Preprints 2009, 50(1), 229. (Year: 2009).*
U.S. Appl. No. 17/175,124, filed Feb. 12, 2021, Picard, et al.
French Preliminary Search Report dated Nov. 13, 2020 in French Application 20 01 490 filed Feb. 14, 2020 (with English Translation of Categories of Cited Documents and Written Opinion), 17 pages.
Cai, T. et al., "Preparation of jellyfish-shaped amphiphilic block-graft copolymers consisting of a poly (ε-caprolactone)-block-poly(pentafluorostyrene) ring and poly(ethylene glycol) lateral brushes," Polymer Chemistry, vol. 3, No. 4, Jan. 1, 2012, XP55739554, 8 pages.
Mindemark, J. et al., "High-performance solid polymer electrolytes for lithium batteries operational at ambient temperature," Journal of Power Sources, vol. 298, Aug. 24, 2015, XP029272484, 5 pages.
Cho, H. et al., "Novel Anion Exchange Membrane Based on Poly(Pentafluorostyrene) Substituted with Mercaptotetrazole Pendant Groups and its Blend with Polybenzimidazole for Vanadium Redox Flow Battery Applications," Polymers, vol. 12, No. 4, Jan. 1, 2020, XP55739536, 14 pages.
Delaittre, G. et al., "The para-fluoro-thiol reaction as an efficient tool in polymer chemistry," Polymer Chemistry, vol. 9, 2018, 7 pages.
Bates, C. M. et al., "ABA Triblock Brush Polymers: Synthesis, Self-Assembly, Conductivity, and Rheological Properties," Macromolecules, vol. 48, 2015, 7 pages.
Li, S. et al., "Molecular Brush with Dense PEG Side Chains: Design of a Well-Defined Polymer Electrolyte for Lithium-Ion Batteries," Macromolecules, vol. 52, 2019, 10 pages.
Makiguchi, K. et al., "Diphenyl Phosphate as an Efficient Cationic Organocatalyst for Controlled/Living Ring-Opening Polymerization of δ- -Valerolactone and ε-Caprolactone," Macromolecules, vol. 44, 2011, 7 pages.
Ott, C. et al., "Post-modification of poly(pentafluorostyrene): a versatile "click" method to create well-defined multifunctional graft copolymers," Chem. Comm., 2008, 3 pages.
Powell, K. T. et al. "Complex Amphiphilic Hyperbranched Fluoropolymers by Atom Transfer Radical self-Condensing Vinyl (Co)polymerization," Macromolecules, vol. 40, No. 13, 2007, 7 pages.
Pollack, K. A. et al., Hyperbranched Fluoropolymer-Polydimethylsiloxance-Poly(ethylene glycol) Cross-Liked Terpolymer Networks Designed for Marine and Biomedical Applications: Heterogeneous Nontoxic Antibiofouling Surfaces, Applied Materials & Interfaces, vol. 6, 2014, 10 pages.

* cited by examiner

[Fig. 1]
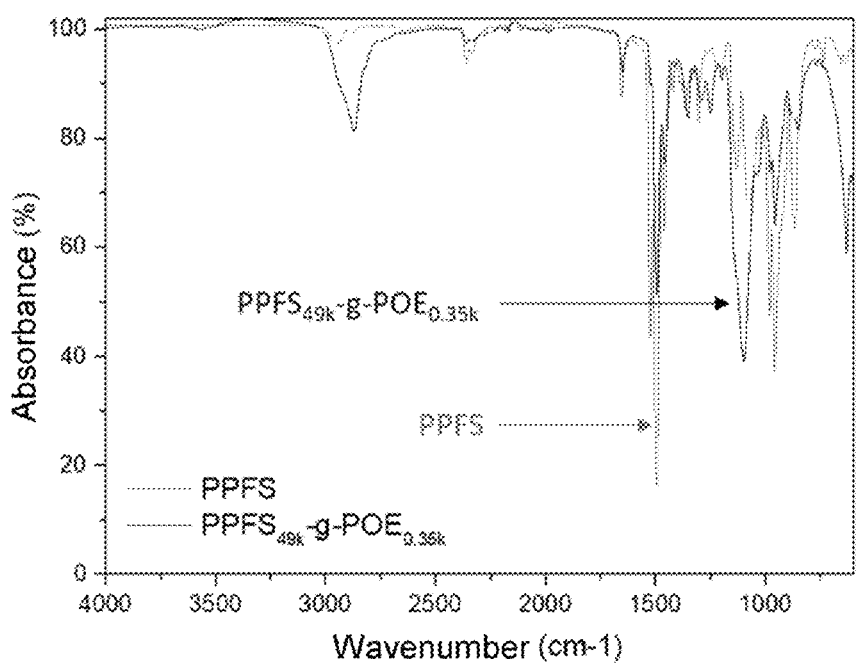
[Fig. 2]
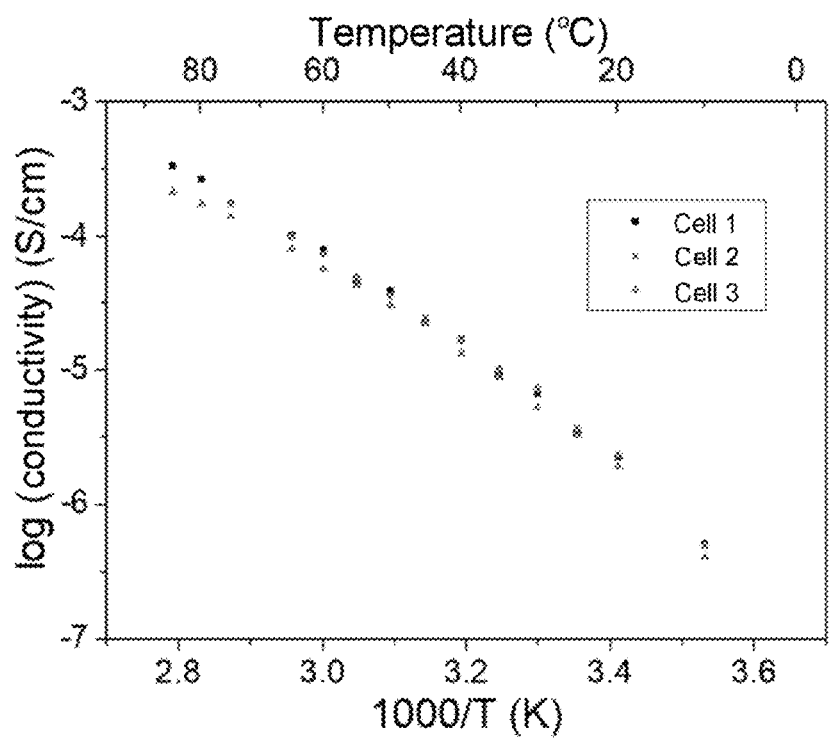

[Fig. 3]
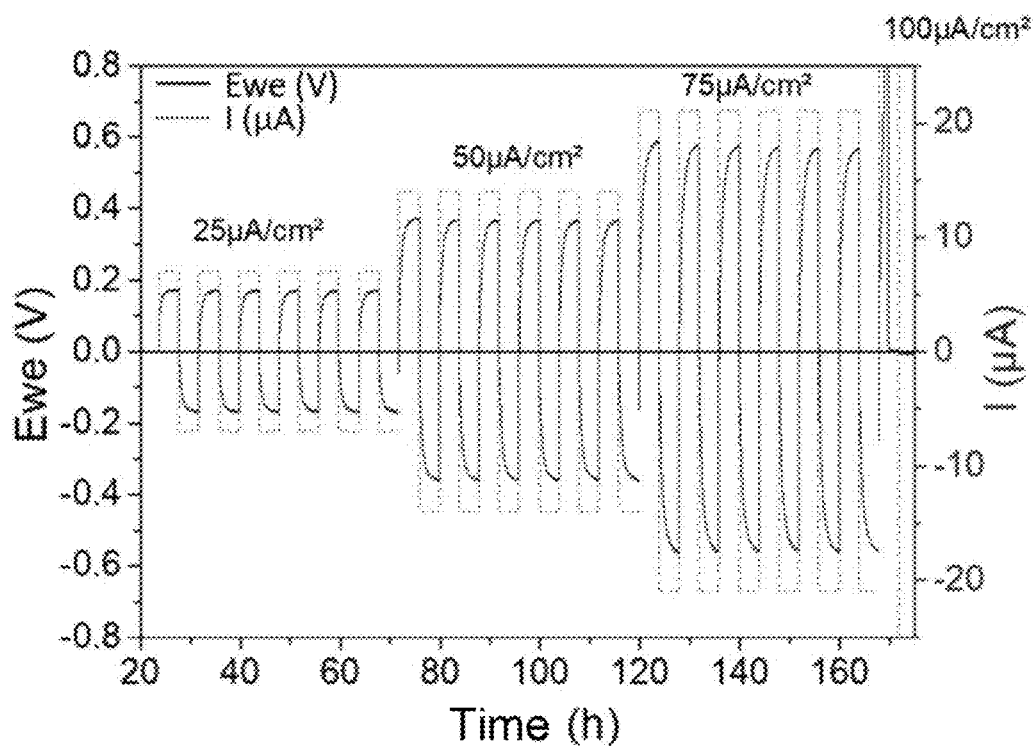
[Fig. 4]
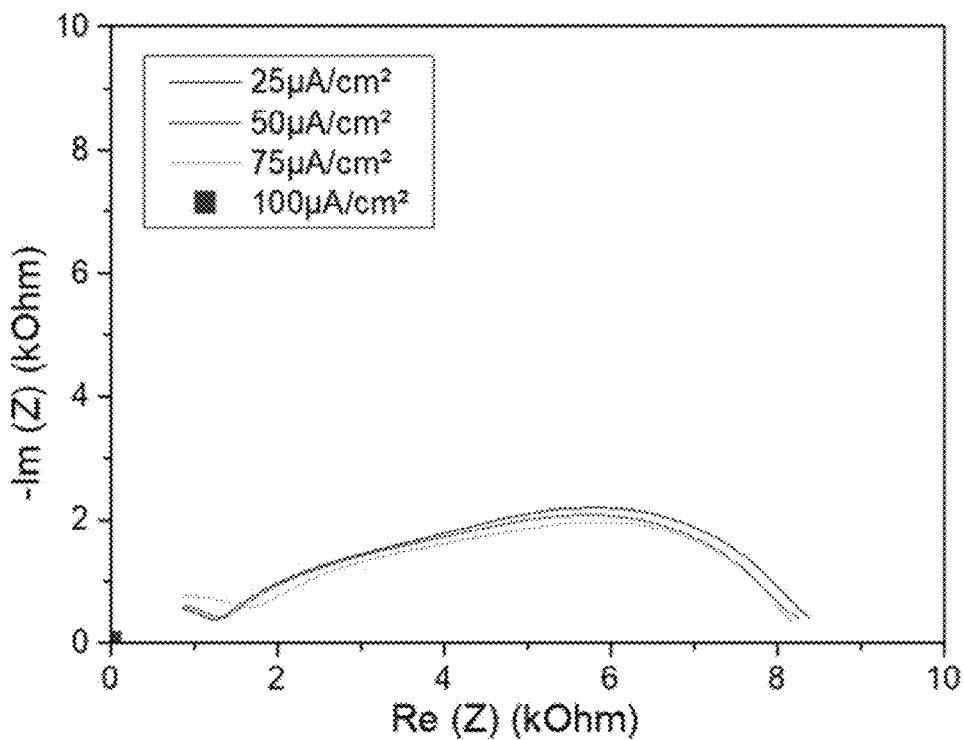

[Fig. 5]
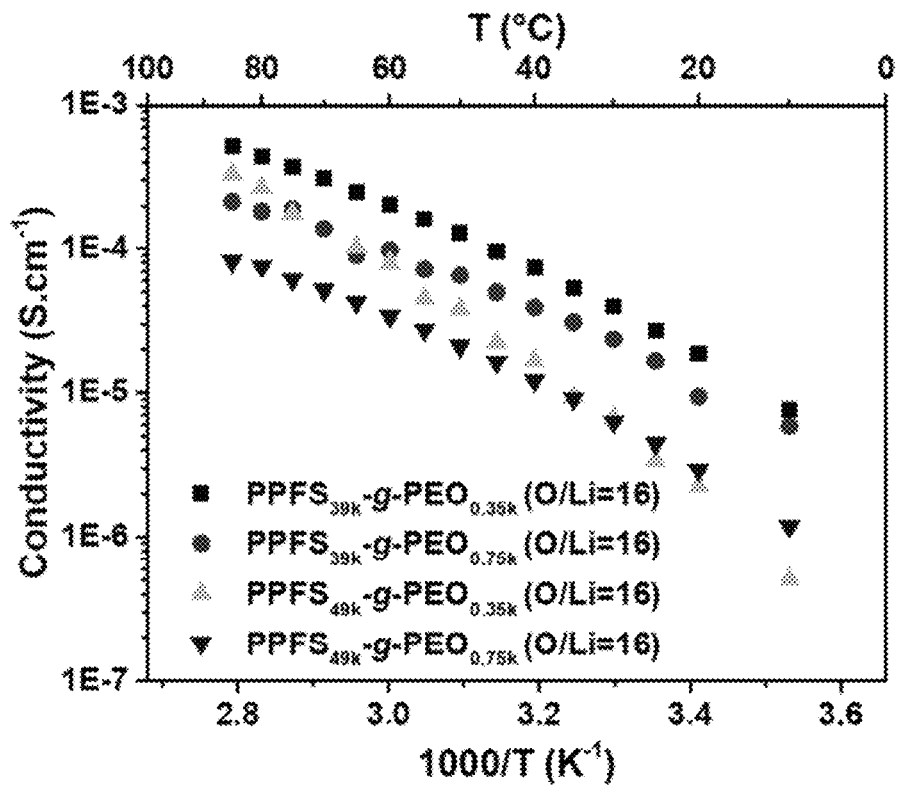
[Fig. 6]
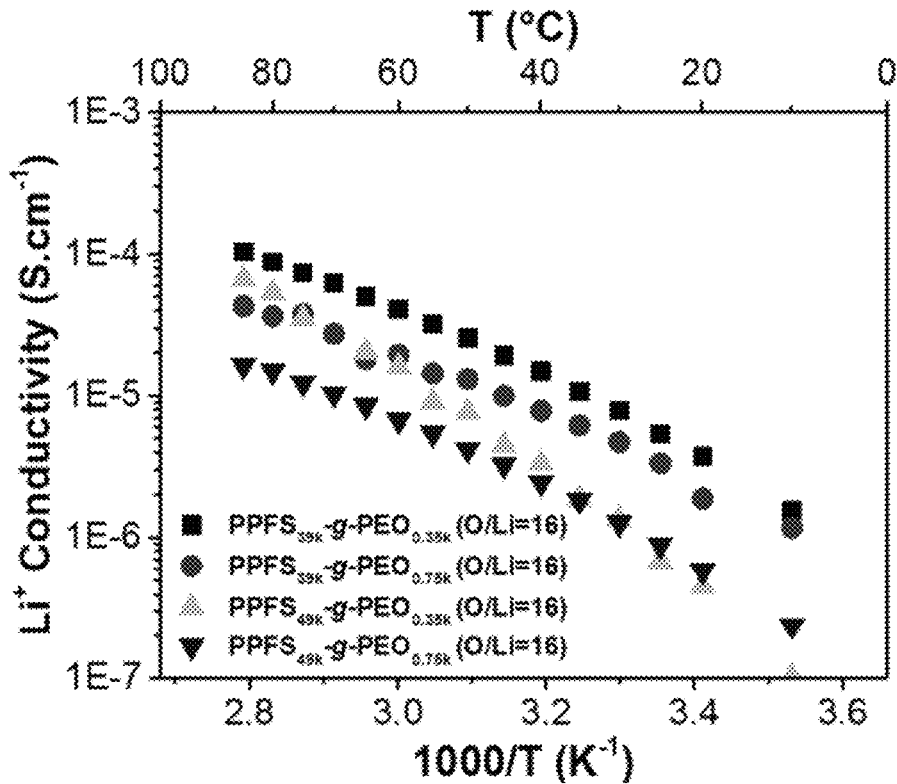

[Fig. 7]
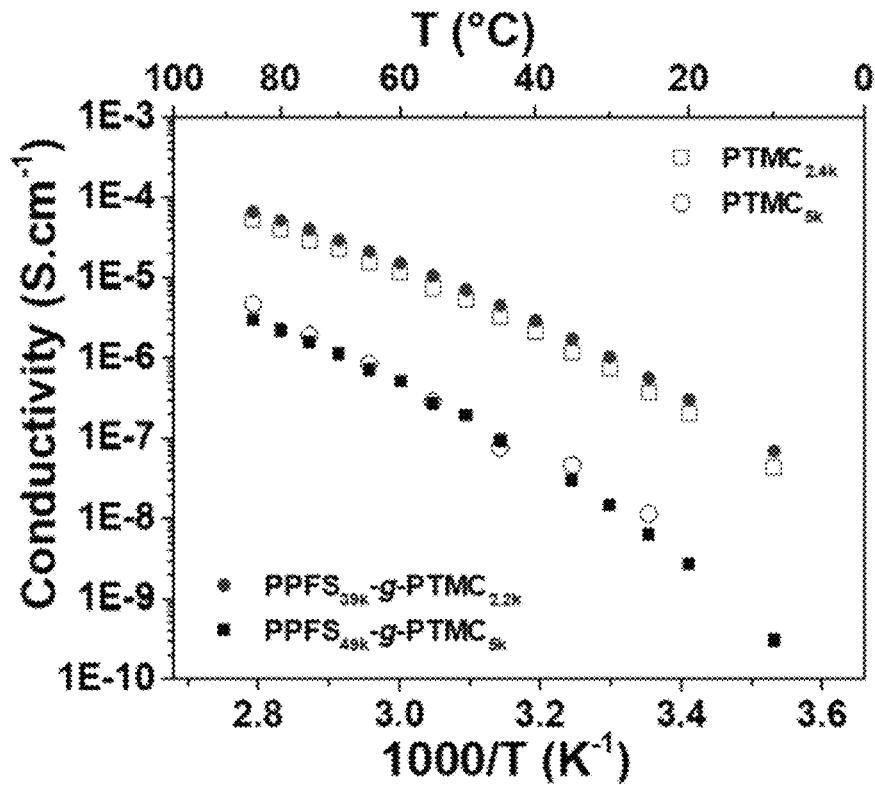
[Fig. 8]
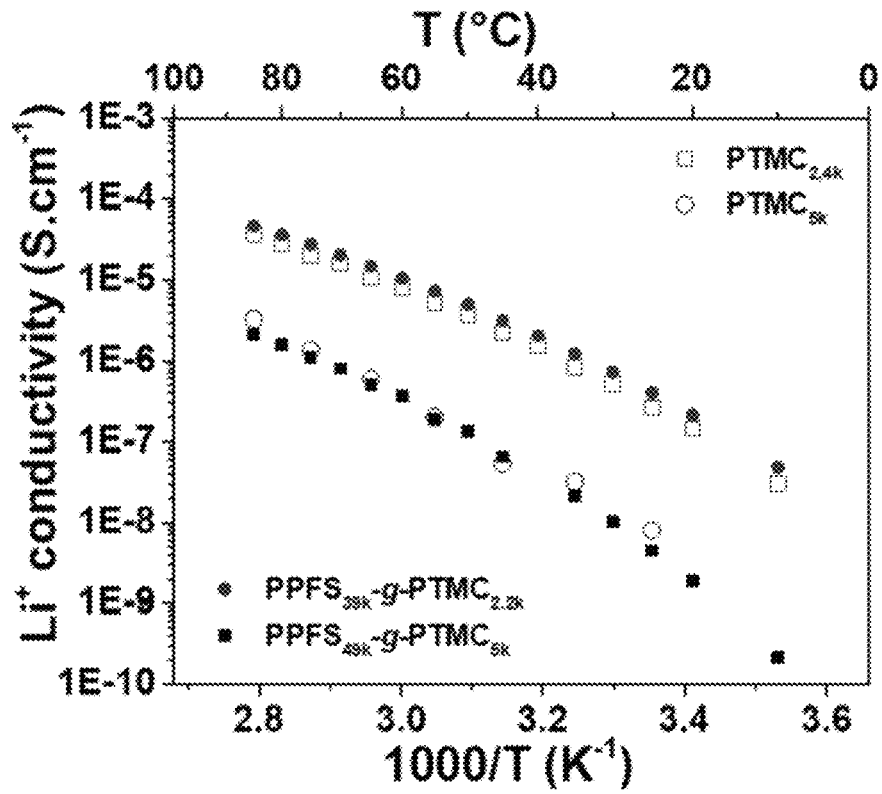

[Fig 9]
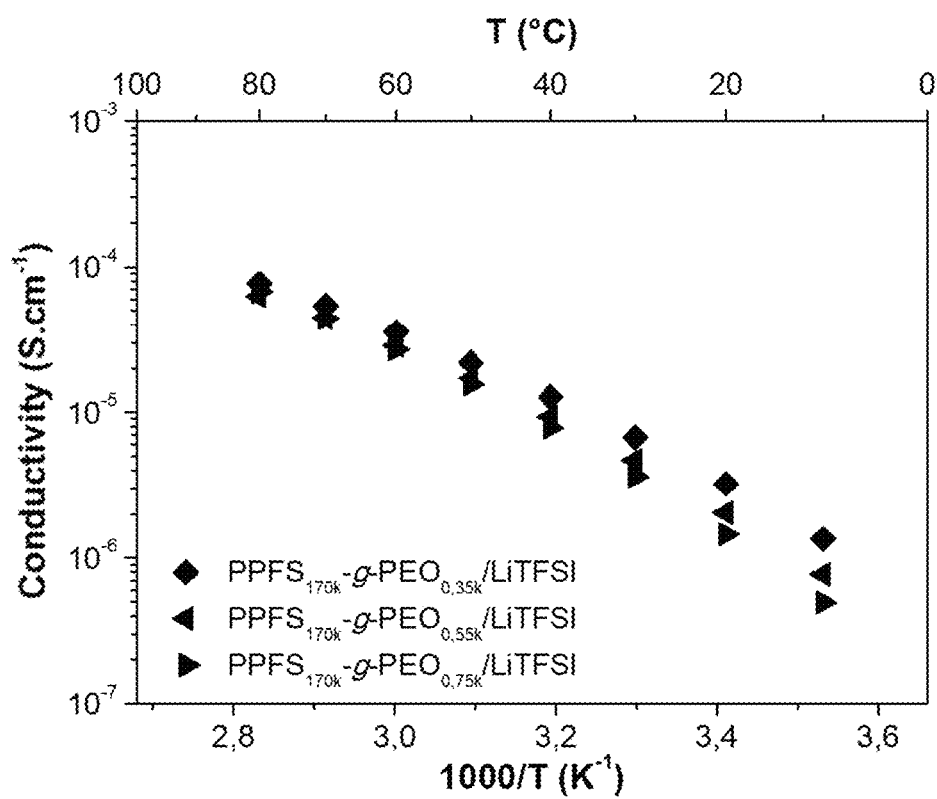

[Fig 10]
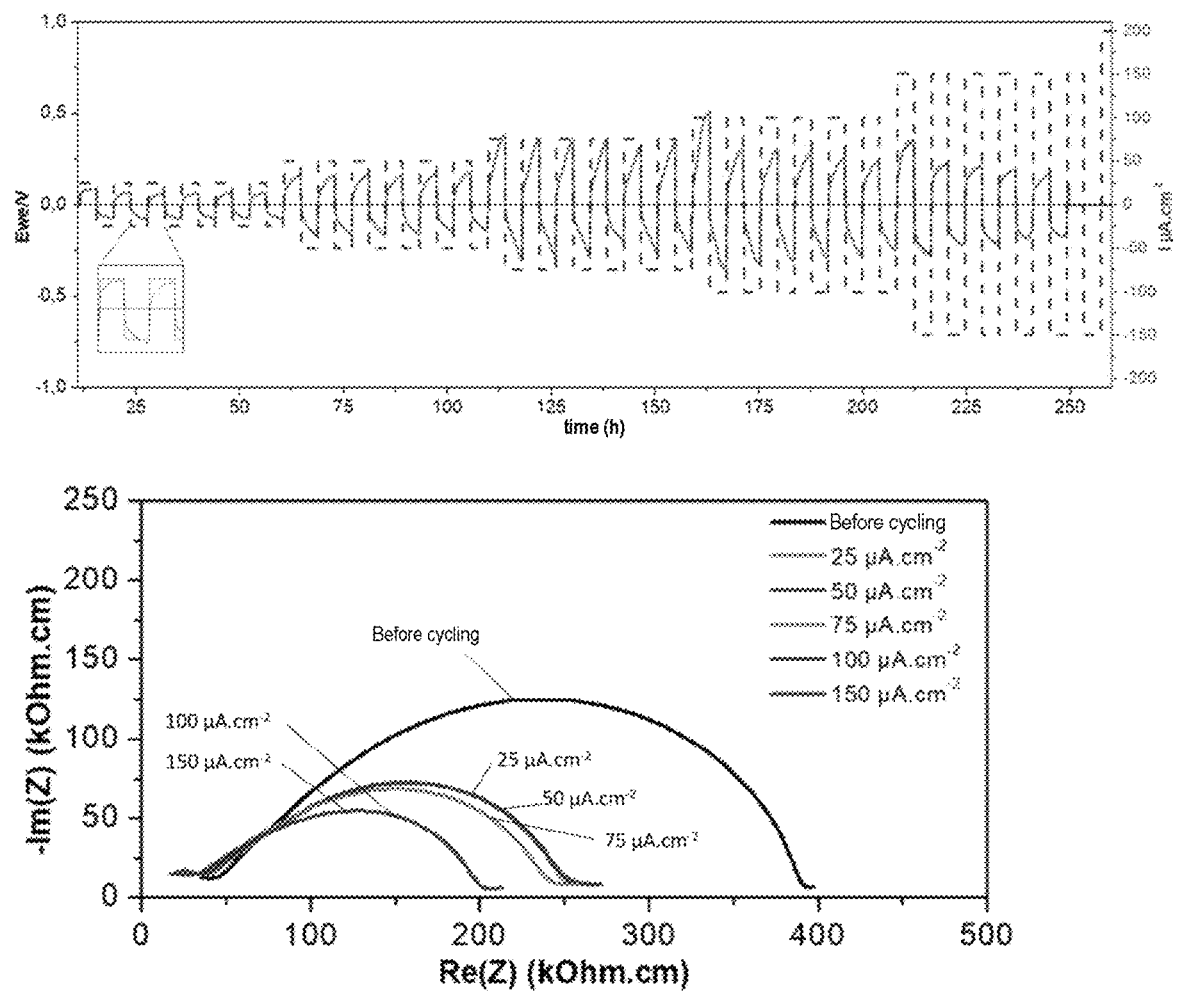

[Fig 11]
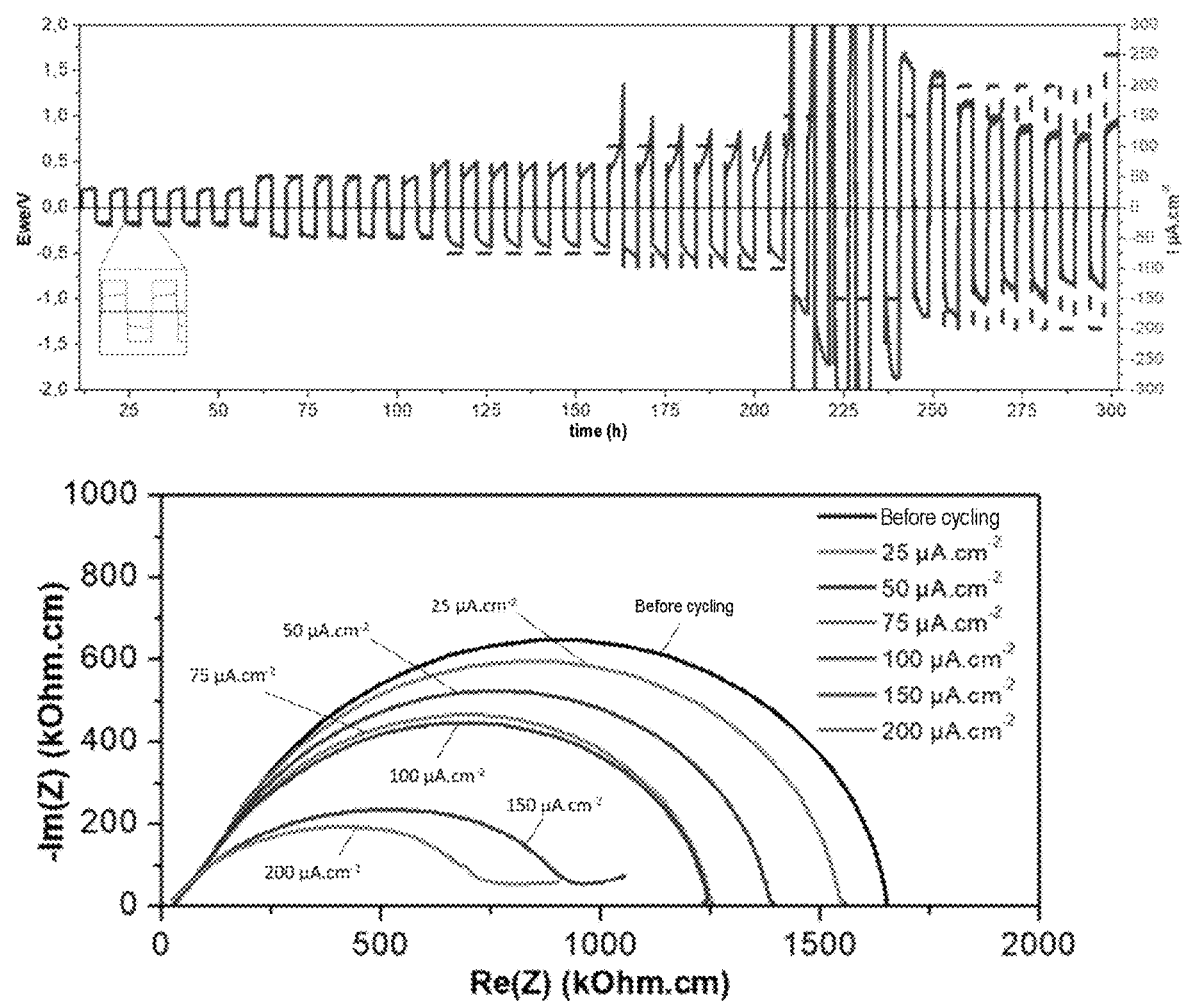

[Fig 12]
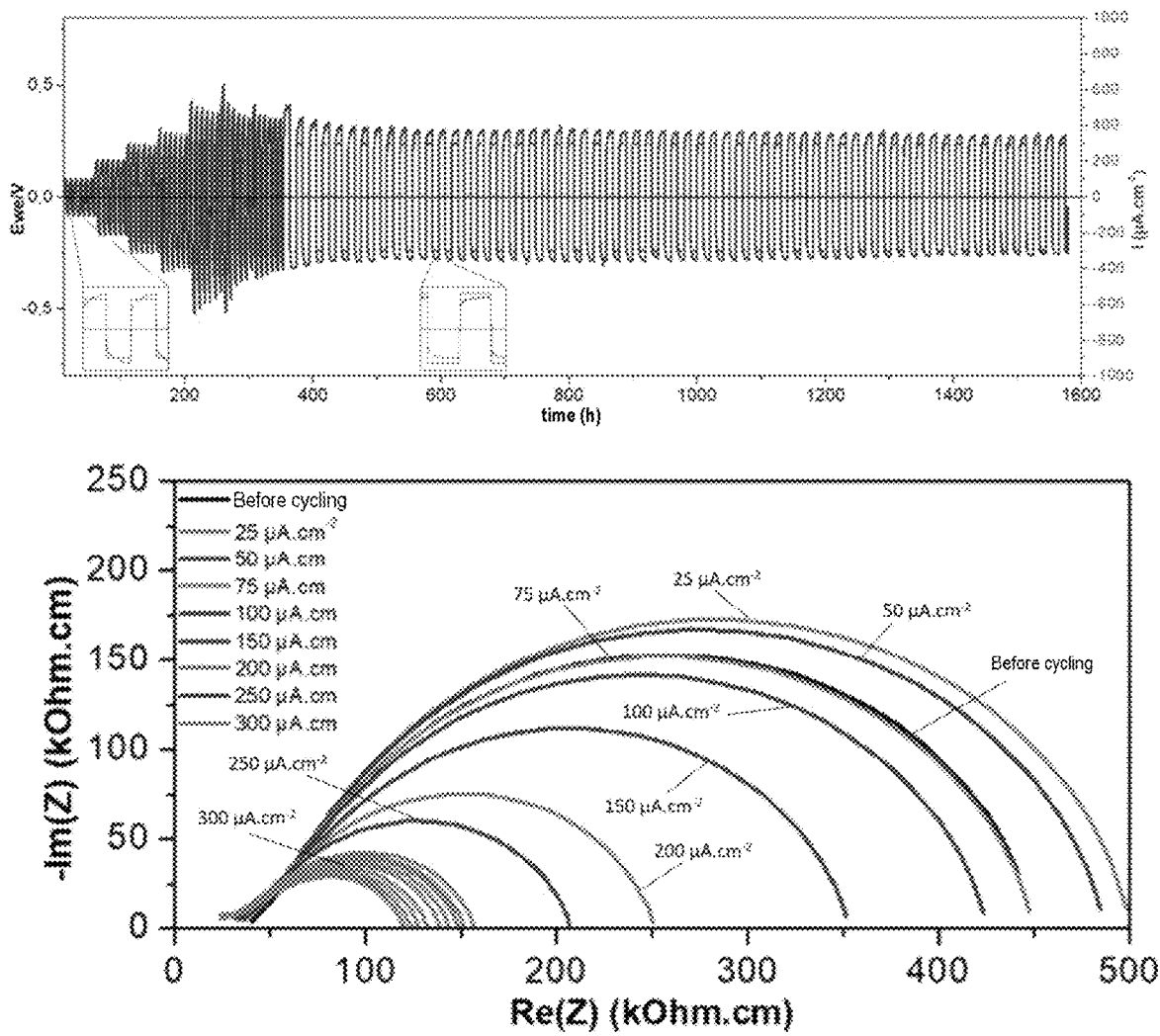

[Fig 13]
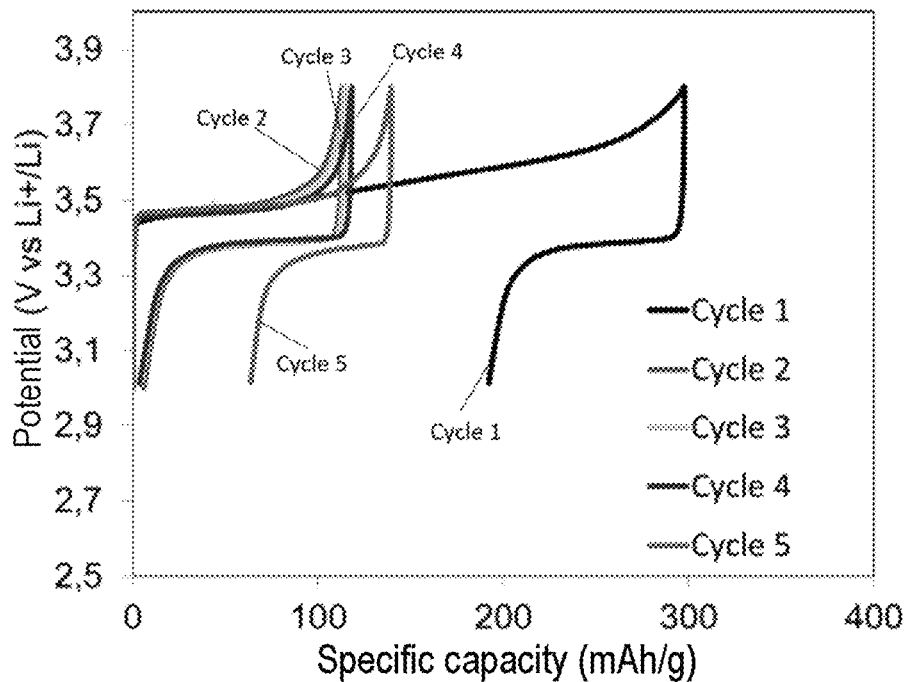
[Fig 14]
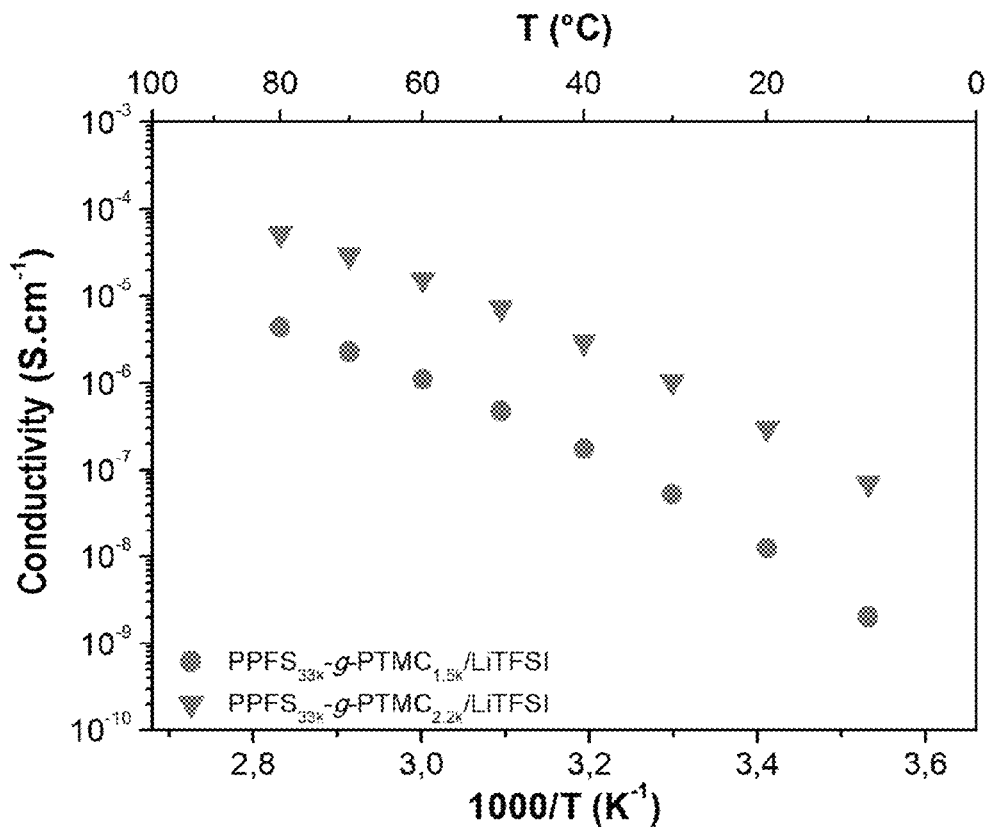

[Fig 15]
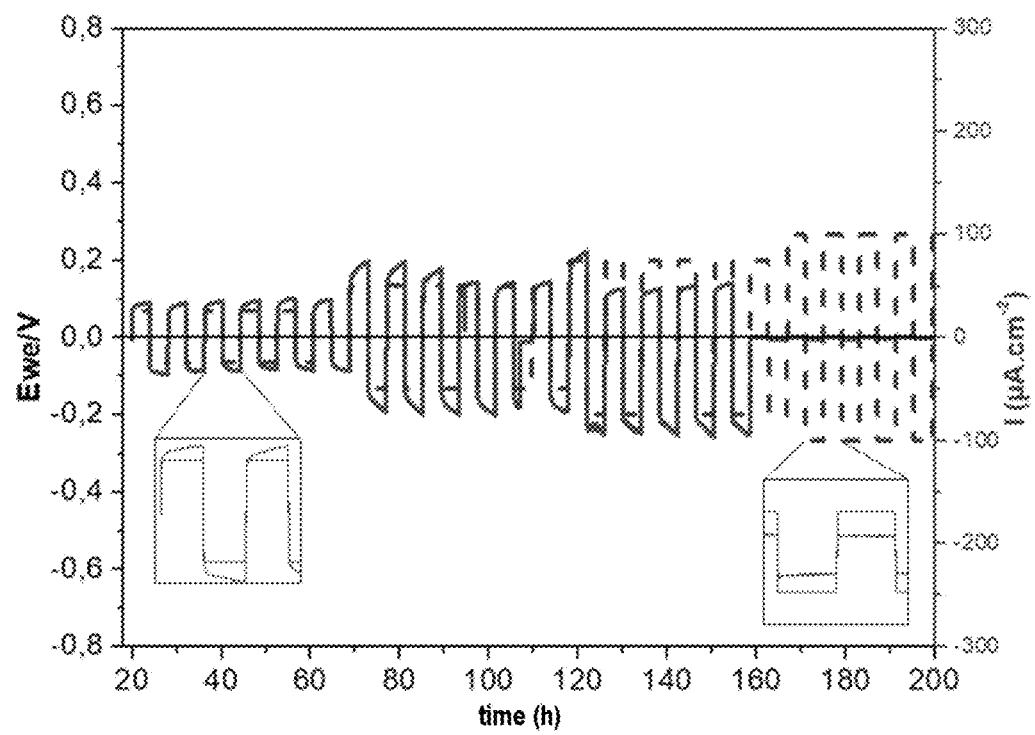
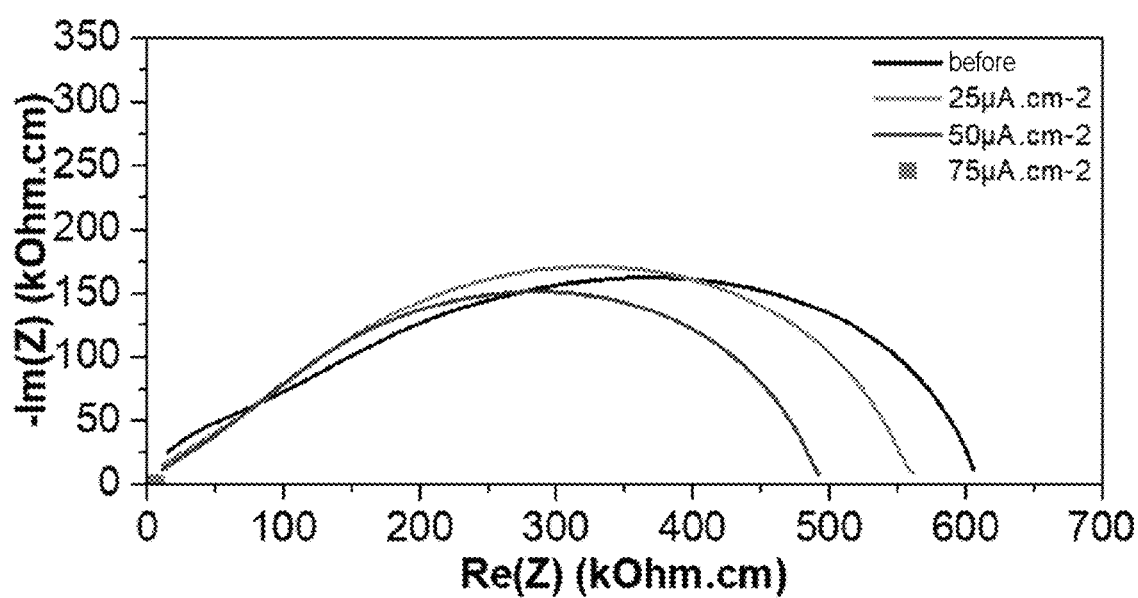

[Fig 16]
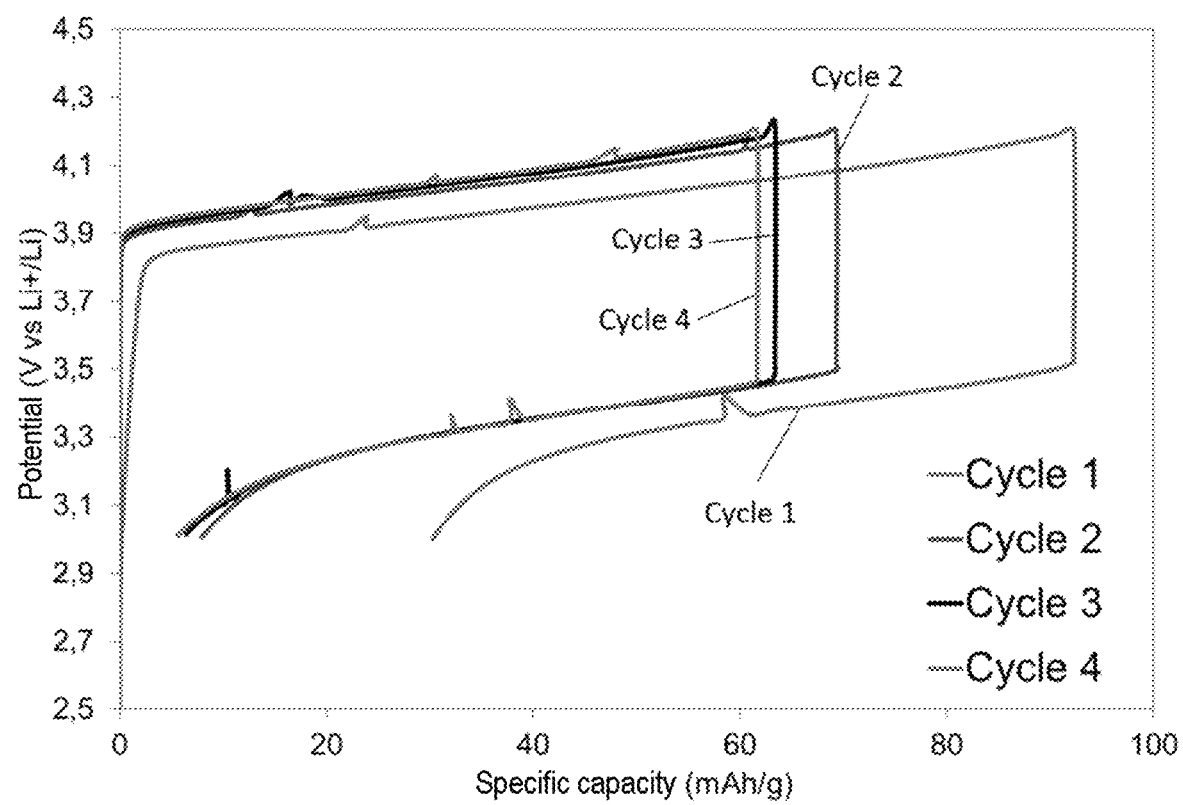

COMB POLYMER

FIELD OF THE INVENTION

The present invention relates to a new comb polymer and to the method for the preparation thereof.

In combination with a salt of an alkali metal or alkaline-earth metal, such comb polymers may be used to form a solid polymer electrolyte, in particular for an electrochemical system or device, especially for a lithium battery.

PRIOR ART

Conventionally, the principle of operation of an electrochemical generator is based on the insertion and withdrawal, also known as "deinsertion", of an alkali metal ion or a proton into and from the positive electrode, and the deposition or extraction of this ion onto and from the negative electrode.

The main systems use the lithium cation as the ion transport species. In the case of a lithium storage battery, for example, the lithium cation extracted from the positive electrode during battery charging is deposited on the negative electrode and, conversely, is extracted from the negative electrode in order to be intercalated in the positive electrode during discharge.

The proton or alkali metal or alkaline-earth metal cation, in particular lithium cation, is transported between the positive electrode and the negative electrode by an ion-conductive electrolyte.

The formulation of the electrolyte used essentially determines the performance of the electrochemical system, in particular when the latter is used at very low or very high temperatures. The electrolyte's ion conductivity especially determines the efficiency of the electrochemical system given that it influences the mobility of the ions between the positive and negative electrodes.

Other parameters are also involved in the selection of the electrolyte used. These are especially the thermal, chemical, or electrochemical stability thereof within the electrochemical system, together with economic, safety and environmental impact criteria, especially including the toxicity of the electrolyte.

In general, the electrolytes of the electrochemical systems assume liquid, gelled or solid form.

In relation to electrolytes in liquid form, conventional electrolytes in electrochemical generators with a metallic cation from one of the first two columns of the periodic table of elements, for example lithium, are composed of a salt of this cation dissolved in an organic or aqueous medium (conventionally in carbonate solvents or acetonitrile for lithium batteries), in the presence or absence of additives.

For example, conventional supercapacitor electrolytes are composed of an organic salt (conventionally a tetraethylammonium tetrafluoroborate, $Et_4N-BF_4$, salt) dissolved in acetonitrile.

However, using them in a complete electrochemical storage system, for example in a Li-ion battery, entails the addition of a separator to provide electrical insulation between the positive and negative electrodes. Also, while these electrolytes do indeed have good ionic conductivity, they present issues of safety and cost in the context of using organic solvents (low thermal stability), and of electrochemical stability in the context of using an aqueous medium.

Gelled electrolytes are a liquid electrolyte, for example as described previously, imprisoned in a "host" polymer. The solvent(s) of the liquid electrolyte must have an affinity for the host polymer which is neither too high (solubilization of the polymer) nor too low (exudation). The host polymer must permit maximum incorporation of liquid while still retaining the mechanical properties to ensure physical separation between the two electrodes.

Finally, in order to address safety issues relating to the presence of the solvent, it has been proposed to use solid polymer electrolytes which contain no solvent. These polymers entering into the composition of the electrolyte must exhibit good ionic conduction properties in order to permit satisfactory use in electrochemical generation and storage systems.

The most widespread electrolyte polymers for electrochemical devices containing lithium are based on polyether, and more particularly on poly(oxyethylene) (POE), in which a salt of an alkali metal or alkaline-earth metal (depending on the electrode chemistry) is dissolved. However, these electrolytes have limited performance in terms of ion conductivity (<0.1 $mS \cdot cm^{-1}$) and electrochemical stability (approximately 4V vs. $Li/Li^+$) at temperatures of below 60° C. due to polymer crystallization. They therefore require a high service temperature (60° C. to 80° C.) and are thus conductive in a molten physical state. Various studies have been carried out with the aim of improving the ionic conduction performance of polymer electrolytes. Polymer electrolytes based on poly(trimethylene carbonate) (PTMC) have accordingly been proposed. PTMC exhibits better conductivity and good electrochemical stability (up to 5V vs. $Li/Li^+$), without any loss of performance due to crystallization at service temperatures. These polymers do, however, have limited mechanical performance.

In order to remedy these limitations, it has been proposed to synthesize copolymers comprising a rigid block providing mechanical properties suited to the use thereof as an electrolyte, and an ion-conductive block.

For example, Bates et al. [2] describe a electrolyte formed of an A-B-A triblock comb polymer, the main chain of which is a polynorbornene while the A and B blocks are respectively formed of norbornene units grafted with polystyrene and POE. These polymers make it possible to achieve ion conductivity of the order of $10^{-3}$ S/cm at 105° C. On the other hand, the triazacyclopentene function connecting the polystyrene to the norbornene, intrinsically limits the electrochemical stability of the electrolyte with regard to high potential differences.

The publication of Li et al. [3], which proposes an architecture having a poly(tert-butyl 2-((2-bromopropionyloxy)methyl) acrylate) (PtBBMA) skeleton and poly(ethylene glycol) methyl ether methacrylate (PEGMA) pendant chain, may also be mentioned. However, the acrylate chains also pose a problem for electrochemical stability.

Endeavors are thus constantly been made to improve the performance of electrolytes based on ion-conductive polymers.

SUMMARY OF THE INVENTION

The present invention is directed precisely at proposing new polymers which can advantageously be used to form solid polymer electrolytes.

More particularly, according to a first of the aspects thereof, it relates to a comb polymer comprising a main chain formed from 1-ethenyl- and/or 1-allyl-2,3,4,5,6-pentafluorobenzene monomers and polymeric side chains grafted in the para position of the pentafluorophenyl groups, in which said polymeric side chains are linked to said main chain by an oxygen atom, the molar grafting rate of polymeric side chains being greater than or equal to 50%.

In the remainder of the text, a polymer chain (or polymer) formed from 1-ethenyl- and/or 1-allyl-2,3,4,5,6-pentafluorobenzene monomers is more simply denoted a "PPFS type" main chain (or polymer)

As more particularly set out in the remainder of the text, the polymeric side chains may more particularly be chains based on solvent polymers of salts of an alkali metal or alkaline-earth metal, which are also known as "solvating" polymers.

More particularly, the polymeric side chains may be of the polyalkylene glycol type, in particular of the poly(ethylene oxide) (written POE or PEO) type.

It may still be a comb polymer having polymeric side chains formed from at least one cyclic monomer selected from five- to eight-membered lactones and cyclic carbonates, in particular side chains of the poly(trimethylene carbonate) (PTMC) or poly(ε-caprolactone) (PCL) type.

Comb polymers with an architecture having a PPFS type chain bearing side chains have already been synthesized. For example, Ott et al. [5] describe modifying a low weight-average molecular mass poly(2,3,4,5,6-pentafluorostyrene) polymer with polyethylene glycol chains having an amine function at the chain end. Grafting with POE gives rise to side chains linked to the PPFS type main chain by amine functions.

Cai el al. [6] also describe the synthesis of a PCL-b-(PPFS-g-PEO) grafted block copolymer in which the PEO grafts are obtained by grafting polyethylene glycol polymers having a thiol type terminal group. The side chains, obtained on completion of the fluorine atom substitution reaction, are grafted onto the PPFS type main chain by means of thioether functions.

The publications by Powell et al. [7] and Pollack et al. [8], which describe "hyperbranched" polymer structures which differ from a comb structure, may also be mentioned.

The comb polymers and hyperbranched polymer structures described in these documents are furthermore in no way intended for use to form a solid polymer electrolyte.

The invention also relates to a method for the preparation of a comb polymer according to the invention as defined previously, comprising at least the steps consisting in:
  (i) providing a polymer formed from 1-ethenyl- and/or 1-allyl-2,3,4,5,6-pentafluorobenzene monomers, known as PPFS type polymer, intended for forming the main chain of the comb polymer; and
  (ii) forming the polymeric side chains in the para position of a proportion of the pentafluorophenyl groups of the monomer units of the PPFS type polymer.

In particular, the polymeric side chains are based on solvent polymers of salts of an alkali metal or alkaline-earth metal.

Advantageously, as set out in detail in the remainder of the text, the PPFS type polymer intended for forming the main chain of the comb polymer according to the invention may be synthesized in advance by polymerization from a mixture of a Ziegler-Natta type catalytic system comprising a catalyst and a co-catalyst; and of 1-ethenyl- and/or 1-allyl-2,3,4,5,6-pentafluorobenzene monomers.

As set out in the remainder of the text, the side chains may be formed by grafting polymers intended for forming said polymeric side chains, especially previously synthesized solvating polymers, in the para position of a proportion of the pentafluorophenyl groups of the monomer units of the PPFS type polymer; or alternatively by carrying out the polymerization of the side chains directly at the level of the PPFS type polymer.

The comb polymers according to the invention, in which the polymeric side chains are based on solvent polymers of salts of an alkali metal or alkaline-earth metal have particularly advantageous applications in forming, in combination with a salt of an alkali metal or alkaline-earth metal, a solid polymer electrolyte.

The invention accordingly also relates to the use of a comb polymer according to the invention or obtained by the method according to the invention, in which the polymeric side chains are based on solvent polymers of salts of an alkali metal or alkaline-earth metal in order to form, in combination with at least one salt of an alkali metal or alkaline-earth metal, a solid polymer electrolyte in an electrochemical system, in particular in a lithium battery.

A "solid electrolyte" is taken to mean an electrolyte which excludes the presence of a component in liquid form and simultaneously serves as a separator and ion conductor in an electrochemical system.

The solid polymer electrolyte formed from a comb polymer according to the invention, in particular having polymeric side chains based on solvating polymers, may be used in numerous electrochemical systems, such as generators, in particular lithium batteries.

The solid polymer electrolyte formed from a comb polymer according to the invention is advantageous in a number of respects.

As illustrated in the following examples, the solid polymer electrolyte according to the invention thus exhibits excellent performance in terms of ion conductivity, even in the absence of additives. In particular, it exhibits Li$^+$ ion conductivity, measured at 60° C., of greater than or equal to $10^{-6}$ S·cm$^{-1}$, in particular of greater than or equal to $10^{-5}$ S·cm$^{-1}$ and advantageously of greater than or equal to $5 \cdot 10^{-5}$ S·cm$^{-1}$.

Furthermore, the solid polymer electrolyte formed from a comb polymer according to the invention exhibits good electrochemical cycling stability.

A solid polymer electrolyte formed from a comb polymer according to the invention, in particular having polymeric side chains based on solvating polymers, thus makes it possible to achieve high ion conduction performance without this being achieved to the detriment of the mechanical integrity of the electrolyte.

An electrochemical system, for example a lithium battery, made from a solid electrolyte according to the invention is capable of functioning over a wide temperature range, preferably between 20° C. and 100° C. and more preferably between 40 and 80° C. Advantageously, a solid polymer electrolyte based on a comb polymer according to the invention having polymeric side chains formed from at least one cyclic monomer selected from five- to eight-membered lactones and cyclic carbonates, in particular side chains of the poly(trimethylene carbonate) (PTMC) or poly(ε-caprolactone) (PCL) type, may advantageously be used in high power density batteries in combination with "high" potential positive electrodes, i.e. operating at a potential difference of greater than 4 V versus Li/Li$^+$, such as Li$^0$ vs. LiNi$_{1/3}$Mn$_{1/3}$Co$_{1/3}$O$_2$ batteries without having an impact on the thermal and electrochemical stability of the electrolyte.

BRIEF DESCRIPTION OF THE DRAWINGS

FIG. 1 shows the infrared spectra respectively of poly(2, 3,4,5,6-pentafluorostyrene) (PPFS) and poly(2,3,4,5,6-pentafluorostyrene) bearing poly(ethylene oxide) grafts ("PPFS$_{49k}$-g-POE$_{0.35k}$") prepared according to example 1;

FIG. 2 shows the variation in ion conductivity (in S·cm$^{-1}$) as a function of temperature (T in ° C., and 1,000/T, T being stated in degrees Kelvin) for the solid electrolyte based on the comb polymer PPFS$_{49k}$-g-POE$_{0.35k}$ prepared according to example 1;

FIG. 3 shows the cycling curves in a symmetrical Li0/electrolyte/Li0 cell using the electrolyte based on the PPFS$_{49k}$-g-POE$_{0.35k}$ comb polymer prepared according to example 1;

FIG. 4 shows the Nyquist diagrams (Im(Z) as a function of Re(Z)) obtained by impedance spectroscopy for the button cell prepared according to example 1 at different current densities.

FIG. 5 shows the variation in ion conductivity (in S·cm$^{-1}$) as a function of temperature for the various electrolytes according to the invention based on PPFS-g-POE type comb polymers prepared in examples 1 and 2.

FIG. 6 shows the contribution of the Li$^+$ ion to ion conductivity for the various electrolytes according to the invention based on PPFS-g-PTMC type comb polymers prepared in examples 1 and 2.

FIG. 7 shows the variation in ion conductivity (in S·cm$^{-1}$) as a function of temperature for the various electrolytes according to the invention based on PPFS-g-PTMC type comb polymers prepared in example 3 and for electrolytes based on PTMC$_{2.4k}$ and PTMC$_{5k}$ not according to the invention.

FIG. 8 shows the contribution of the Li$^+$ ion to ion conductivity for the various electrolytes according to the invention based on PPFS-g-PTMC type comb polymers prepared in example 3 and for electrolytes based on PTMC$_{2.4k}$ and PTMC$_{5k}$ not according to the invention.

FIG. 9 represents the change in the ion conductivity (in S·cm$^{-1}$) as a function of the temperature, for the various electrolytes according to the invention based on comb polymers of the type PPFS-g-PEO prepared in example 4;

FIG. 10 represents the galvanostatic cycling characterizations (GCPL) performed in a symmetrical button cell (Li/Li), and the associated EIS monitoring (Nyquist diagrams), for the electrolyte PPFS$_{170k}$-g-PEO$_{0.35k}$/LiTFSI (20% by mass, 60° C.) prepared in example 4;

FIG. 11 represents the galvanostatic cycling characterizations (GCPL) performed in a symmetrical button cell (Li/Li), and the associated EIS monitoring (Nyquist diagrams), for the electrolyte PPFS$_{170k}$-g-PEO$_{0.55k}$/LiTFSI (20% by mass, 60° C.) prepared in example 4;

FIG. 12 represents the galvanostatic cycling characterizations (GCPL) performed in a symmetrical button cell (Li/Li), and the associated EIS monitoring (Nyquist diagrams), for the electrolyte PPFS$_{170k}$-g-PEO$_{0.75k}$/LiTFSI (20% by mass, 60° C.) prepared in example 4;

FIG. 13 represents the Li/LFP cycling behavior for the electrolyte PPFS$_{170k}$-g-PEO$_{0.75k}$/LiTFSI ([LiTFSI]=20% by mass) at 60° C.;

FIG. 14 represents the change in the ion conductivity (in S·cm$^{-1}$) as a function of temperature, for the various electrolytes according to the invention based on comb polymers of the type PPFS-g-PTMC prepared in example 5;

FIG. 15 represents the galvanostatic cycling characterizations (GCPL) performed in a symmetrical button cell (Li/Li), and the associated EIS monitoring (Nyquist diagrams), for the electrolyte PPFS$_{33k}$-g-PTMC$_{1.5k}$/LiTFSI (20% by mass, 60° C.) prepared in example 5;

FIG. 16 represents the Li-NMC cycling behavior for the electrolyte PPFS$_{33k}$-g-PTMC$_{1.5k}$/LiTFSI ([LiTFSI]=20% by mass) at 60° C.

In the remainder of the text, the expressions "of between . . . and . . . ", "of from . . . to . . . " and "varying from . . . to . . . " are equivalent and, unless otherwise indicated, should be taken to mean that the limits are included.

DETAILED DESCRIPTION

Comb Polymer According to the Invention

The invention uses a comb polymer comprising, or even formed of, a main chain formed from 1-ethenyl- and/or 1-allyl-2,3,4,5,6-pentafluorobenzene monomers, a proportion of the monomer units of the main chain bearing polymeric side chains, said chains being grafted in the para position of the pentafluorophenyl groups.

In the remainder of the text, the comb polymer used according to the invention will be known more simply as "comb polymer".

A "comb polymer", also denoted branched copolymer, is taken to mean a polymer which has a linear polymer main chain and at least two side chains or pendant chains attached to the main chain at points located between the two extremities of the main chain which are denoted branching points. Unlike linear polymers which comprise non-polymeric side groups or pendant groups, the side chains of comb polymers are oligomers, polymers or copolymers.

In particular, a comb polymer is different from "hyperbranched" polymer networks. In particular, the polymeric side chains borne by the main chain of the comb polymer according to the invention do not themselves bear polymeric side chains.

In the present description, unless stated otherwise, the term "polymer" will be used in the broad sense to denote not only homopolymers but also copolymers. A "copolymer" is taken to mean a polymer derived from at least two different monomer species.

A "monomer unit" is taken for the purposes of the present invention to mean the smallest constituent unit which, repeated, gives rise to a polymer chain.

As previously mentioned, the main chain of the comb polymers according to the invention is formed from 1-ethenyl- and/or 1-allyl-2,3,4,5,6-pentafluorobenzene monomers.

The monomers of the 1-ethenyl-2,3,4,5,6-pentafluorobenzene type, also more commonly denoted 2,3,4,5,6-pentafluorostyrene (PFS) and 1-allyl-2,3,4,5,6-pentafluorobenzene (IUPAC name 1,2,3,4,5-pentafluoro-6-prop-2-enylbenzene), are of the following formula (M1):

[Chem 1]

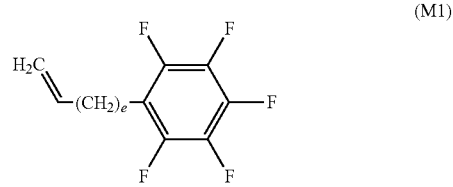

(M1)

in which e has the value 0 (in the case of pentafluorostyrene) or e has the value 1 (in the case of 1-allyl-2,3,4,5,6-pentafluorobenzene).

The main chain of the comb polymer according to the invention is preferably formed of a homopolymer.

According to a first embodiment, the main chain of the comb polymer according to the invention is formed of a poly(2,3,4,5,6-pentafluorostyrene) (PPFS).

According to another embodiment, the main chain of the comb polymer according to the invention is formed of a poly(1,2,3,4,5-pentafluoro-6-prop-2-enylbenzene).

For simplicity's sake, in the remainder of the text, the main polymer chain of the comb polymers according to the invention, in particular of the poly(2,3,4,5,6-pentafluorostyrene) or poly(1,2,3,4,5-pentafluoro-6-prop-2-enylbenzene) type, will be more simply denoted by the name "pentafluorostyrene type chain" or alternatively "PPFS type chain".

In particular, the main polymer chain of the comb polymers used according to the invention may have a number-average degree of polymerization corresponding to the number of monomer units making up the main polymer chain of greater than or equal to 50, in particular between 50 and 4,200 and more particularly between 50 and 520.

The main polymer chain of the comb polymers used according to the invention may have a number-average molecular mass $M_n$ of between 5,000 g·mol$^{-1}$ and 1,000,000 g·mol$^{-1}$, in particular between 10,000 g·mol$^{-1}$ and 200,000 g·mol$^{-1}$, notably between 10,000 g·mol$^{-1}$ and 100,000 g·mol$^{-1}$ and more particularly between 20,000 g·mol$^{-1}$ and 50,000 g·mol$^{-1}$.

In particular, said main chain may have a number-average molecular mass $M_n$ of between 9,700 g·mol$^{-1}$ and 814,800 g·mol$^{-1}$, in particular between 9,700 g·mol$^{-1}$ and 100,880 g·mol$^{-1}$ and more particularly between 12,000 g·mol$^{-1}$ and 50,000 g·mol$^{-1}$.

The number-average molecular mass may be determined by steric exclusion chromatography (SEC).

The comb polymer used according to the invention may or may not have low-dispersity PPFS type main chains.

According to one particular embodiment, the comb polymer according to the invention has a main chain formed of a poly(2,3,4,5,6-pentafluorostyrene), in particular having a number-average molecular mass of between 9,700 g·mol$^{-1}$ and 814,800 g·mol$^{-1}$, in particular between 9,700 g·mol$^{-1}$ and 200,000 g·mol$^{-1}$, notably between 9,700 g·mol$^{-1}$ and 100,880 g·mol$^{-1}$ and more particularly between 12,000 g·mol$^{-1}$ and 50,000 g·mol. Preferably, as described in the remainder of the text, the length of the main chain of the comb polymer according to the invention, i.e. the degree of polymerization of the main chain of the comb polymer according to the invention, is sufficiently high for comb polymer formed according to the invention to have a molar mass greater than the "critical entanglement" molar mass.

The critical entanglement molar mass, denoted $M_c$, for a given polymer is generally defined as the mass from which the polymer dynamics are in creep mode. This critical entanglement molar mass may be determined empirically by methods known to a person skilled in the art.

Controlling the average molecular mass of the comb polymer according to the invention makes it possible to control the mechanical properties of the comb polymer obtained, and in particular the viscoelastic properties thereof.

The comb polymer according to the invention is advantageously capable of forming a three-dimensional network as a result of entanglement of the polymer chains and has a rubbery plateau which is identifiable for example by rheological measurements (for example Young's modulus and shear modulus measured by multifrequency dynamic mechanical analysis) on the resultant polymer.

By way of example, a comb polymer according to the invention formed of a poly(2,3,4,5,6-pentafluorostyrene) main chain grafted by poly(ethylene oxide) type side chains has a glass transition temperature, denoted $T_g$, of 60° C.; a comb polymer according to the invention formed of a poly(2,3,4,5,6-pentafluorostyrene) main chain grafted by poly(trimethylene carbonate) type side chains has a $T_g$ of −40° C.

The comb polymer according to the invention preferably has a molar grafting rate of polymeric side chains of less than or equal to 99%, preferably between 25 and 95%, and especially between 50 and 95%.

A "polymeric side chain" (or "side chain based on a polymer") is taken to mean that at least a proportion of the side or pendant chain, attached to the main chain, is formed of a polymer (or of said polymer). There is nothing to rule out this side chain having other functionalities, such as, for example a function or succession of functions connecting the side chain to the main chain, or alternatively a function at the free extremity of the side chain, for example a function arising from the initiator having been used in the synthesis of said side chain polymer.

According to one particular embodiment, the comb polymer according to the invention comprises polymeric side chains formed at least in part of solvent polymers of salts of an alkali metal or alkaline-earth metal, also denoted solvating polymers.

For the purposes of the invention, a "solvating" polymer is a polymer capable of dissolving one or more salts of an alkali metal or alkaline-earth metal, for example lithium, sodium, magnesium or calcium salts, in particular lithium salts. More particularly, a solvating polymer comprises heteroatoms, preferably oxygen atoms.

A solvating polymer is a polymer which includes solvating units that are capable of ionically dissociating a metal salt (or of solvating the cations of the alkali metal or alkaline-earth metal salt), in particular units containing at least one heteroatom, notably chosen from sulfur, oxygen and nitrogen, preferably oxygen.

The solvating polymers forming said side chains of the comb polymer according to the invention may thus, in combination with a salt of an alkali metal or alkaline-earth metal, be ion conductors. An "ion-conductive polymer" is taken to denote a polymer which is capable of conducting ions, and more particularly cations, in particular the proton H$^+$ and alkali metal and alkaline-earth metal cations, and more particularly is capable of conducting lithium cations. The ion conduction mechanism of said polymer chains used according to the invention may be of various kinds.

The polymeric side chains are preferably formed by homopolymers.

The polymeric side chains of a comb polymer according to the invention more particularly comprise oxygen atoms, in particular ether, ester or carbonate ester functions.

The polymeric side chains are linked in the para position of the pentafluorophenyl groups of the PPFS type main chain by means of an oxygen atom, more particularly by means of an ether function. In other words, the para carbon atom of the pentafluorostyrene group in a grafted monomer unit of a comb polymer according to the invention bears an oxygen atom.

In particular, the comb polymer according to the invention may comprise grafted monomer units of the following formula (I):

[Chem 2]

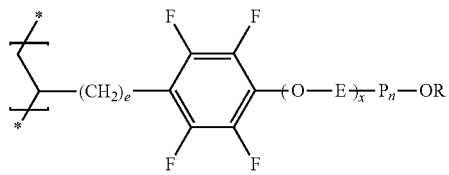
(I)

in which:
e has the value 0 or 1;
x has the value 0 or 1;
E represents a $C_1$ to $C_6$, in particular $C_1$ to $C_3$, and especially $C_1$ or $C_2$ alkylene group;
$P_n$ represents a polymer chain, in particular formed at least in part of a solvent polymer of salts of an alkali metal or alkaline-earth metal, in particular of lithium salts, said polymer chain more particularly comprising oxygen atoms, in particular ether, ester or carbonate ester functions, with $P_n$ preferably being of the following formula (C):

[Chem 3]

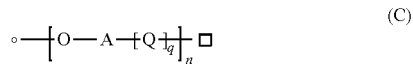
(C)

with A representing a linear or branched $C_2$ to $C_{11}$ alkylene group, in particular a linear $C_2$ to $C_{11}$ and in particular $C_2$ to $C_5$ alkylene group (in other words a —$(CH_2)_p$— group with p being an integer between 2 and 11 and in particular between 2 and 5);
q has the value 0 or 1;
Q represents an oxycarbonyl —OC(O)— or carbonyl —C(O)— group;
n is a positive integer, corresponding to the degree of polymerization of the polymer chain $P_n$, in particular n is greater than or equal to 4, in particular between 5 and 1,000, especially between 5 and 500 and more particularly between 5 and 100;
○ representing the bond of the polymeric side chain to the monomer unit of the main chain, if applicable by means of the —O-E- group, and □ the bond with the OR group;
R represents a "non-reactive" group (or chain end).

A "non-reactive" group is taken to denote a group which is non-reactive under the conditions of preparation and use of the comb polymer. More particularly, the group R has no functions which are reactive toward the monomer units making up the PPFS type main chain and the polymer chains making up the side chains in the comb polymer formed, nor functions reactive toward alkali or alkaline-earth metals, especially toward metallic lithium, toward salts of an alkali metal or alkaline-earth metal, especially toward lithium salts, and toward the various active materials according to the invention. Group R must accordingly especially comprise no hydroxyl function, amine function, thiol function or indeed a halogen atom other than fluorine.

Group R may more particularly be:
a linear or branched alkyl group which may be substituted by fused or unfused, saturated or unsaturated or aromatic or non-aromatic mono- or polycyclic or mono- or polyheterocyclic groups; or
a fused or unfused, saturated or unsaturated or aromatic or non-aromatic mono- or polycyclic or mono- or polyheterocyclic group;
the alkyl group and/or said mono- or poly(hetero)cyclic group(s) optionally possibly being substituted by one or more fluorine atoms.

For the purposes of the invention:
"$C_{t-z}$", where t and z are integers, is taken to mean a carbon-containing chain which may have from t to z carbon atoms; for example $C_{1-4}$ is a carbon-containing chain which may have from 1 to 4 carbon atoms;
"alkyl" is taken to mean a linear or branched saturated aliphatic group; for example a $C_{1-4}$ alkyl group represents a linear or branched carbon-containing chain with 1 to 4 carbon atoms, more particularly a methyl, ethyl, propyl, isopropyl, butyl, isobutyl or tert-butyl;
"polycyclic group" is taken to mean a group having two or a plurality of nuclei (rings) which are fused (ortho-fused or ortho- and peri-fused) to one another, i.e. having, two by two, at least two carbons in common.
"heterocycle" is taken to mean a, preferably 4-, 5- or 6-membered, cyclic group comprising one or more heteroatoms, in particular selected from oxygen, sulfur and nitrogen. The mono- or poly(hetero)cyclic groups according to the invention may be unsaturated, partially saturated or saturated. An aromatic cycle may especially be benzene. In particular, a polycyclic group according to the invention is formed of two to six rings, the rings comprising, independently of one another, from 4 to 6 members. The polycyclic group may include one or more heteroatoms. This is then known as a "polyheterocyclic group".

According to one particular embodiment, the comb polymer according to the invention thus comprises grafted monomer units of the following formula (I'):

[Chem 4]

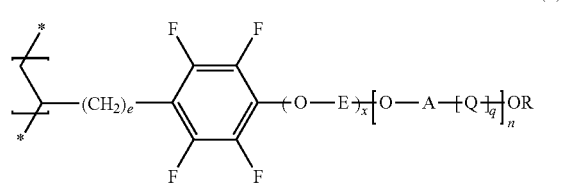
(I')

in which e, E, x, A, Q, q, n and R are as previously defined.

More particularly, the comb polymer according to the invention may comprise grafted monomer units of the formula (I"):

[Chem 5]

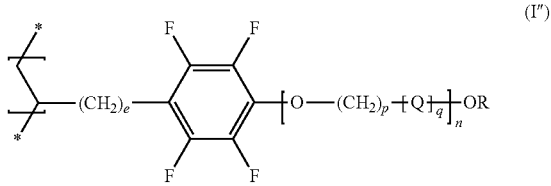
(I")

in which e, p, Q, q, n and R are as previously defined.

The R groups at the free extremity of the side chains may more particularly arise from the ROH initiator used for synthesizing said grafted polymer chain, in particular for ring-opening synthesis (also known as "ring-opening polymerization" (ROP)) of cyclic monomers of the lactone or cyclic carbonate type, as described in greater detail in the remainder of the text. Examples of ROH initiators are more particularly given in the remainder of the text.

The R group preferably has a molar mass of less than or equal to 500 g·mol$^{-1}$, in particular between 30 and 300 g·mol$^{-1}$, preferably less than or equal to 260 g·mol$^{-1}$ and especially less than or equal to 250 g·mol$^{-1}$.

The R group preferably represents:

a $C_1$ to $C_{20}$ alkyl group, optionally substituted by a phenyl group; or a phenyl group;

said alkyl and phenyl group(s) optionally being substituted by one or more fluorine atoms. By way of example, R may be a methyl group or a 3-phenylpropyl group.

The polymeric side chains of the comb polymer according to the invention preferably have a number-average degree of polymerization, corresponding to the number of monomer units making up the polymeric side chain, of greater than or equal to 4, in particular between 5 and 1,000 and more particularly between 5 and 500 and more particularly between 5 and 100.

In particular, the comb polymer according to the invention may comprise grafted monomer units of the above-stated formula (I') in which n is greater than or equal to 4, in particular between 5 and 1,000 and more particularly between 5 and 500 and more particularly between 5 and 100.

The polymeric side chains of the comb polymer according to the invention preferably have a number-average molecular mass $M_n$ of between 200 and 120,000 g·mol$^{-1}$, in particular between 200 and 60,000 g·mol$^{-1}$ and more particularly between 200 and 12,000 g·mol$^{-1}$. The number-average molecular mass may be controlled especially during synthesis of the polymer making up the side chains by the molar ratio of said monomer(s) to the initiator. The polymeric side chains of the comb polymer according to the invention preferably have low dispersity, revealing approximately identical side chain lengths. In particular, mass dispersity, denoted $D_w$, is preferably between 1 and 2.5 and in particular between 1.01 and 1.5. Low dispersity of the side chains of the comb polymer according to the invention advantageously makes it possible to achieve, when it is used to form a solid polymer electrolyte according to the invention, better nanosegregation of the phases between the main chains comprising the fluorinated aromatic cycles and the pendant chains and thus to improve mechanical and ion conductivity properties in the case of side chains based on solvating polymers.

Mass dispersity $D_w$ may be calculated from the equation $D_w = M_w/M_n$ with $M_w$ representing the weight-average molecular mass and $M_n$ representing the number-average molecular mass.

The comb polymer used according to the invention is preferably of the formula (II):

[Chem 6]

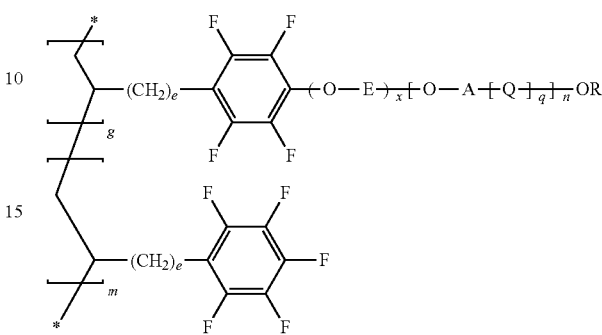

in which e, E, x, A, Q, q, n and R are as previously defined;

g corresponds to the average number of monomer units bearing polymeric side chains according to the invention; and m corresponds to the average number of ungrafted monomer units;

with g/(g+m), which represents the molar grafting rate of polymeric side chains, being less than or equal to 0.99, in particular being between 0.25 and 0.99, preferably being greater than or equal to 0.50 and less than or equal to 0.99, and especially between 0.5 and 0.95; the order of succession of the two types of monomer units forming the polymer of the formula (II) being completely random.

The comb polymer used according to the invention may in particular be of the formula (II'):

[Chem 7]

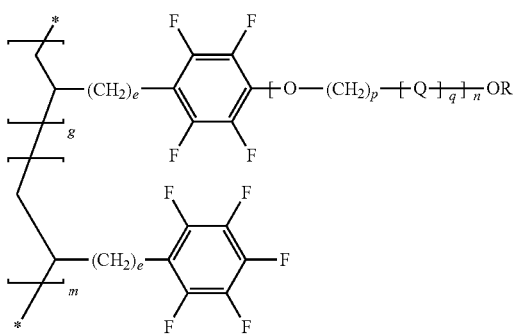

in which e, p, q, Q, n, R, g and m are as previously defined, the order of succession of the two types of monomer units forming the polymer of the formula (II') being completely random.

The chain ends or extremities of the PPFS type main polymer chain, which are not shown on the above-stated formulas (II) and (II'), may for example be methyl, ethyl, butyl or alkenyl groups. The nature of these extremities especially depends on the kind of Ziegler-Natta type catalyst used for synthesizing the PPFS type main chain, as set out in detail in the remainder of the text.

According to a first variant embodiment, the comb polymer according to the invention has polyalkylene glycol type side chains, for example of the polyethylene glycol and/or polypropylene glycol type, or the copolymers thereof. The comb polymer according to the invention may preferably have side chains of the polyethylene glycol (also known as poly(ethylene oxide) or POE) type.

In other words, the comb polymer according to the invention may more particularly comprise monomer units of the above-stated formula (I'), in which x has the value 0 or 1 and in particular x has the value 0; q=0, A represents —(CH$_2$)$_p$— with p between 2 and 5 and in particular p has the value 2; and R represents CH$_3$.

The monomer units of the PPFS type main chain of the comb polymer according to the invention may be thus of the following formula (I'-a):

[Chem 8]

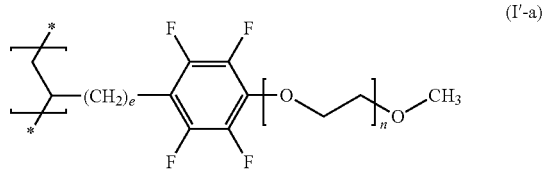

(I'-a)

in which e and n are as previously defined, in particular e has the value 0.

In particular, the comb polymer may be of the above-stated formula (II') in which q=0, p=2 and R represents CH$_3$.

The side chains of the poly(alkylene glycol) type, in particular of the poly(ethylene oxide) type, of the comb polymer according to the invention have a degree of polymerization of between 4 and 1,000, in particular greater than or equal to 5, preferably greater than or equal to 6 and in particular between 8 and 100.

In particular, the grafted poly(ethylene oxide) type chains may have a weight-average molar mass of between 200 and 50,000 g·mol$^{-1}$ and preferably between 350 and 5,000 g·mol$^{-1}$.

According to one particular embodiment, the comb polymer according to the invention is formed of a poly(2,3,4,5,6-pentafluorostyrene) main chain bearing poly(ethylene oxide) type side chains.

According to another variant embodiment, the comb polymer according to the invention has polymeric side chains formed from at least one cyclic monomer selected from five- to eight-membered lactones and cyclic carbonates, in particular side chains of the poly(trimethylene carbonate) (denoted PTMC) or poly(ε-caprolactone) (denoted PCL) type.

As described in greater detail in the remainder of the text, the polymer chains used as side chains of a comb polymer according to the invention may be obtained by ring-opening polymerization of one or more cyclic monomers selected from five- to eight-membered lactones and cyclic carbonates in the presence of at least one organic molecule, known as "initiator", bearing a hydroxyl function, denoted ROH.

The cyclic monomers are more particularly of the following formula:

[Chem 9]

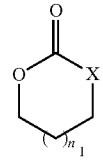

(M2)

in which:
X represents a carbon atom or an oxygen atom;
n$_1$ has the value 0 or is an integer between 1 and 9 and in particular between 1 and 3;
said monomers optionally being substituted, on one or more of the ring carbon atoms, by one or more substituents R$_1$.

The cyclic monomer substituents, R$_1$, may more particularly be selected from linear or branched, in particular C$_1$ to C$_5$, alkyl groups.

According to one particular embodiment, the comb polymer according to the invention has polymeric side chains formed from five- to eight-membered cyclic carbonate type monomers.

The cyclic carbonates may more particularly be of the following formula (M3):

[Chem 10]

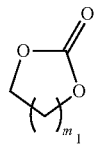

(M3)

m$_1$ being an integer between 1 and 3 and m$_1$ preferably having the value 1 or 2;
said monomers optionally being substituted, on one or more of the ring carbon atoms, by one or more substituents R$_1$ as previously defined.

Trimethylene carbonate and the derivatives thereof, in particular trimethylene carbonate, may be mentioned by way of example of a cyclic carbonate monomer.

A comb polymer according to the invention may more particularly comprise monomer units of the above-stated formula (I') in which x has the value 0 or 1 and preferably x=0; q=1; A represents —(CH$_2$)$_p$— with p between 2 and 4 and in particular p=3; Q represents —O—C(O)— and R is as defined previously, in particular R is a group arising from the ROH initiator used for synthesizing the polymeric side chain from cyclic carbonate type monomers.

The grafted monomer units of the comb polymer according to the invention may be of the following formula (I'-b):

[Chem 11]

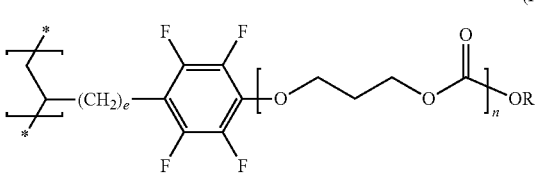

(I'-b)

in which e and n are as previously defined; and R represents a group arising from the ROH initiator used for synthesizing the poly(trimethylene carbonate) (PTMC) polymeric side chain.

The side chains formed from monomers of the cyclic carbonate type, in particular of the poly(trimethylene carbonate) type, of the comb polymer according to the invention have a degree of polymerization of between 5 and 500, in particular between 5 and 200, and preferably between 5 and 75.

In particular, the grafted poly(trimethylene carbonate) type chains may have a weight-average molar mass of between 510 and 51,000 g·mol$^{-1}$, preferably between 510 and 20,400 g·mol$^{-1}$ and preferably between 510 g·mol$^{-1}$ and 7,650 g·mol$^{-1}$.

According to one particular embodiment, the comb polymer according to the invention is formed of a poly(2,3,4,5, 6-pentafluorostyrene) main chain bearing poly(trimethylene carbonate) type side chains, in particular as previously defined.

According to one particular embodiment, the comb polymer according to the invention has polymeric side chains formed from lactone type monomers.

A lactone is more particularly taken to mean monomers of the following formula:

[Chem 12]

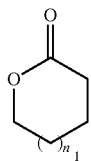

(M4)

in which $n_1$ is an integer of from 1 to 9, in particular from 1 to 3;

said monomers optionally being substituted, on one or more of the ring carbon atoms, by one or more substituents $R_1$ as previously defined.

ε-Caprolactone may be mentioned by way of example of a lactone type monomer.

A comb polymer according to the invention may more particularly comprise monomer units of the above-stated formula (I') in which x has the value 0 or 1 and preferably x=0; q=1; A represents —$(CH_2)_p$— with p between 4 and 12 and in particular between 4 and 6, in particular p=5; Q represents —O—C(O)— and R is as defined previously, in particular R is a group arising from the ROH initiator used for synthesizing the polymeric side chain from lactone type monomers.

The grafted monomer units of the comb polymer according to the invention may be of the following formula (I'-c):

[Chem 13]

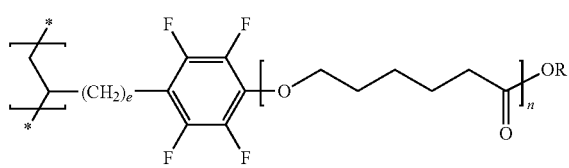

(I'-c)

in which e and n are as previously defined; and R represents a group arising from the ROH initiator used for synthesizing the poly(ε-caprolactone) (PCL) polymeric side chain.

The side chains formed from monomers of the lactone type, in particular of the poly(ε-caprolactone) type, of the comb polymer according to the invention have a degree of polymerization of between 5 and 500, in particular between 5 and 200, and preferably between 5 and 75.

The grafted poly(ε-caprolactone) type chains may in particular have a weight-average molar mass of between 570 and 57,000 g·mol$^{-1}$, preferably between 570 and 22,800 g·mol$^{-1}$ and preferably between 570 and 8,550 g·mol$^{-1}$.

According to one particular embodiment, the comb polymer according to the invention is formed of a poly(2,3,4,5, 6-pentafluorostyrene) main chain bearing poly(ε-caprolactone) type side chains, in particular as previously defined.

It goes without saying that a comb polymer according to the invention may comprise polymeric side chains of different kinds, in particular selected from among side chains of the poly(ethylene oxide), poly(trimethylene carbonate) and/or poly(ε-caprolactone) type. The comb polymer according to the invention preferably has side chains of the same kind.

Synthesis of the Comb Polymer According to the Invention

The invention also relates to a method for the preparation of a comb polymer according to the invention, in particular as defined previously, said method resulting in the formation of the polymeric side chains at the level of a PPFS type polymer formed from 1-ethenyl- and/or 1-allyl-2,3,4,5,6-pentafluorobenzene monomers.

More particularly, the invention relates to a method for the synthesis of a comb polymer according to the invention as defined previously comprising at least the steps consisting in:

(i) providing a polymer formed from 1-ethenyl- and/or 1-allyl-2,3,4,5,6-pentafluorobenzene monomers, known as PPFS type polymer, intended for forming the main chain of the comb polymer; and (ii) forming the polymeric side chains in the para position of a proportion of the pentafluorophenyl groups of the monomer units of said PPFS type polymer.

In particular, the polymeric side chains are based on solvent polymers of salts of an alkali metal or alkaline-earth metal.

(i) PPFS Type Polymer

As mentioned previously, the comb polymer according to the invention is formed from a previously synthesized PPFS type polymer and intended for forming the main chain of the comb polymer according to the invention, in particular as previously described.

The PPFS type polymer derives from the polymerization of 1-ethenyl- and/or 1-allyl-2,3,4,5,6-pentafluorobenzene monomers of the formula (M1) as previously defined.

The PPFS type polymer is thus of the following formula (III):

[Chem 14]

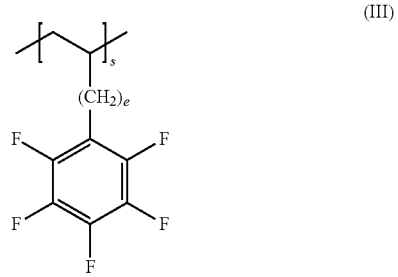

(III)

in which e has the value 0 or 1;

s represents the number of monomer units of the PPFS type polymer (corresponding to the degree of polymerization), in particular s is between 25 and 5,155, in particular between 50 and 4,200, especially between 51 and 510 and preferably between 100 and 520 and in particular between 100 and 258.

The PPFS type polymer is preferably a homopolymer and preferably a poly(2,3,4,5,6-pentafluorostyrene).

The PPFS type polymer, intended for forming the main chain, in particular of the poly(2,3,4,5,6-pentafluorostyrene) type, may have a number-average molecular mass $M_n$ of between 5,000 g·mol$^{-1}$ and 1,000,000 g·mol$^{-1}$, in particular between 10,000 g·mol$^{-1}$ and 100,000 g·mol$^{-1}$ and more particularly between 20,000 g·mol$^{-1}$ and 50,000 g·mol$^{-1}$.

In particular, the poly(2,3,4,5,6-pentafluorostyrene) polymer may have a number-average molecular mass of between 9,700 g·mol$^{-1}$ and 814,800 g·mol$^{-1}$, in particular between 9,700 g·mol$^{-1}$ and 100,880 g·mol$^{-1}$ and more particularly between 12,000 g·mol$^{-1}$ and 50,000 g·mol$^{-1}$.

In particular, it may have a low mass dispersity, especially as previously defined for the main polymer chain of the comb polymer according to the invention.

The PPFS type polymer may be obtained by synthesis methods known to a person skilled in the art. For example, it may be synthesized by a free-radical polymerization method, in particular by controlled free-radical polymerization, as described by example by Jankova et al. [9].

Alternatively to the methods described in the literature, according to one particularly advantageous variant embodiment, the PPFS type polymer intended for forming the main chain of a comb polymer according to the invention is synthesized by Ziegler-Natta catalysis.

Advantageously, this synthesis variant makes it possible to give rise to good yields of polymers having adjustable average molecular masses and dispersity.

The PPFS type polymer may thus be formed by polymerization from a mixture of a Ziegler-Natta type catalytic system comprising a catalyst and a co-catalyst and of 1-ethenyl- and/or 1-allyl-2,3,4,5,6-pentafluorobenzene monomers.

This synthesis method more particularly comprises:
  contacting a Ziegler-Natta type catalytic system comprising a catalyst and a co-catalyst with monomers of the above-stated formula (M1);
  exposing the resultant mixture to stirring and heating conditions favorable to the polymerization of said monomers.

Ziegler-Natta type catalytic systems have already been described for example for the synthesis of polyolefins ([10]-[12]). The Ziegler-Natta type catalytic system of type may be of any generation, i.e. 1st, 2nd, 3rd, 4th or later. Said catalytic system may be supported, homogeneous or heterogeneous.

The Ziegler-Natta type catalytic system used for synthesizing the PPFS type polymer may comprise:
  a catalyst containing a derivative, especially a halide or an alkoxide, of a transition metal of group IV, V or VI of the periodic table of elements, preferably selected from titanium, zirconium, vanadium, cobalt, chromium and nickel; and
  a co-catalyst containing a hydride or an alkylated derivative of an element of columns 1, 2 or 13 of the periodic table of elements, and preferably containing a hydride or an alkylated derivative of aluminum.

According to one particular variant of this embodiment, the catalyst containing a derivative of a transition metal of group IV, V or VI of the periodic table of elements is selected from among TiCl$_4$, TiCl$_3$, VCl$_3$, VCl$_4$, CoCl$_2$, Ti(OBu)$_4$ and Cr(acac)$_3$.

In particular, the co-catalyst containing a hydride or an alkylated derivative of an element from columns 1, 2 or 13 of the periodic table of elements is selected from among AlEt$_3$, AlEt$_2$Cl, AlEtCl, AlEtCl$_2$, AlBu$_3$, GaEt$_3$ and BeEt$_2$. Preferably, according to this embodiment, the catalytic system is selected from among TiCl$_4$/AlEt$_3$, TiCl$_3$/AlEt$_2$Cl, TiCl$_3$/GaEt$_3$, TiCl$_3$/BeEt$_2$, VCl$_4$/AlEt$_2$Cl, CoCl$_2$/AlEtCl, VCl$_3$/AlEt$_3$, Ti(OBu)$_4$/AlEt$_3$, Cr(acac)$_3$/AlEt$_3$, and still more preferably is TiCl$_4$/AlEt$_3$.

Such a Ziegler-Natta type catalytic system may be for example prepared by adding triethylaluminum to titanium chloride and then leaving the mixture to stabilize for 30 minutes.

Alternatively, the Ziegler-Natta type catalytic system may comprise:
  TiCl$_4$ supported on MgCl$_2$ as catalyst; and
  AlEt$_3$ as co-catalyst.

Alternatively, the Ziegler-Natta type catalytic system may comprise:
  a catalyst selected from metallocenes; and
  a co-catalyst selected from methylaluminoxane (MAO), Ph$_3$C$^+$B(C$_6$F$_5$)$_4$$^-$ and B(C$_6$F$_5$)$_3$.

Preferably, according to this embodiment, the catalytic system is selected from among ZrCp$_2$Cl$_2$/MAO, ZrCp$_2$Cl$_2$/B(C$_6$F$_5$)$_3$, ZrCp$_2$Cl$_2$/Ph$_3$C$^+$B(C$_6$F$_5$)$_4$$^-$, CpTiCl$_3$/MAO, and

[Chem 15]

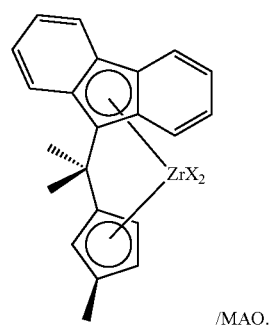

/MAO.

According to one preferred embodiment, the catalyst/co-catalyst ratio molar is between 0.3 and 10 and preferably between 0.5 and 2.

Contacting a Ziegler-Natta type catalytic system, in particular as defined previously, with the monomers of the above-stated formula (M1) may be carried out by simple mixing in the presence or absence of a solvent such as fluorobenzene or tetrahydrofuran. The monomer (M1)/catalytic system molar ratio may be between 10 and 1,000 and in particular between 10 and 250.

The mixture is then exposed to stirring and heating conditions favorable to the polymerization of the monomers (M1). In particular, the mixture may be exposed to a temperature plateau of between 60° C. and 80° C., especially for a duration of at least 10 hours. Stirring may be carried out manually or mechanically, in particular with the assistance of a conventional stirring device.

Preferably, synthesis of the PPFS type polymer is followed by a catalyst neutralization step, for example with ethanol and then filtration of the catalytic system. The resultant PPFS type polymer may be precipitated, for example in methanol.

(ii) Formation of the Polymeric Side Chains

The polymeric side chains, in particular as previously defined for the comb polymer according to the invention, are formed in a step (ii).

According to a first variant embodiment, the side chains may be formed by grafting polymers intended for forming said polymeric side chains, in particular previously synthesized solvent polymers of salts of an alkali metal or alkaline-earth metal (solvating polymers), in the para position of a proportion of the pentafluorophenyl groups of the monomer units of the PPFS type polymer.

In this first variant embodiment, the polymeric side chains may be formed in step (ii) of the method of the invention by contacting the PPFS type polymer with at least one polymer which is intended for forming the polymeric side chains of the comb polymer and has at one of the extremities thereof a free hydroxyl function (—OH) under conditions favorable to grafting said polymer in the para position of a pentafluorophenyl group.

The polymer intended for forming the polymeric side chains of the comb polymer according to the invention may be of the following formula (IV).

[Chem 16]

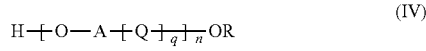

(IV)

in which A, Q, q, n and R are as previously defined.

In particular, the polymer intended for forming the polymeric side chains of the comb polymer according to the invention may be of the following formula (IV').

[Chem 17]

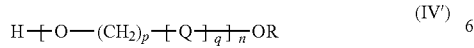

(IV')

in which p, Q, q, n and R are as previously defined.

The polymers intended for forming the polymeric side chains of the comb polymer according to the invention may be available commercially, or alternatively be synthesized according to methods known to a person skilled in the art.

The polymers intended for forming the polymeric side chains of the comb polymer according to the invention preferably have low dispersity. In particular, mass dispersity, denoted $D_w$, is preferably between 1 and 2.5 and in particular between 1.01 and 1.5.

As described previously, according to a first variant embodiment, the polymer intended for forming the polymeric side chains of the comb polymer according to the invention may be a polyalkylene glycol, preferably a polyethylene glycol, bearing a single terminal hydroxyl function (chain end), the other terminal function being a function non-reactive toward the PPFS type polymer, preferably a $C_1$-$C_4$ alkyl group, in particular a methyl group.

Such polymers may be synthesized according to methods known to a person skilled in the art, or alternatively be commercially available, for example from Sigma-Aldrich.

A described previously, the polyethylene glycol may have a weight-average molar mass of between 200 and 50,000 g·mol$^{-1}$ and preferably between 350 and 5,000 g·mol$^{-1}$.

According to another variant embodiment, the polymer intended for forming the polymeric side chains of the comb polymer according to the invention may be a polymer of at least one cyclic monomer selected from five- to eight-membered lactones and cyclic carbonates, in particular as previously defined, and having a single free terminal hydroxyl function. In particular, it may be a poly(trimethylene carbonate) (PTMC) or poly(ε-caprolactone). These polymers may be synthesized by ring-opening polymerization (ROP) from cyclic monomers in the presence of at least one organic molecule, known as an "initiator", bearing a hydroxyl function, and optionally in the presence of at least one catalyst of the polymerization reaction, for example following the protocol described by Makiguchi et al. [4].

The initiator for the synthesis of the polymer from cyclic monomers of the lactone or cyclic carbonate type is more particularly of the formula ROH with R being as defined previously.

The ROH initiator used for synthesizing the polymer intended for forming the polymeric side chains of the comb polymer according to the invention may be selected for example from the following molecules.

[Chem 18]

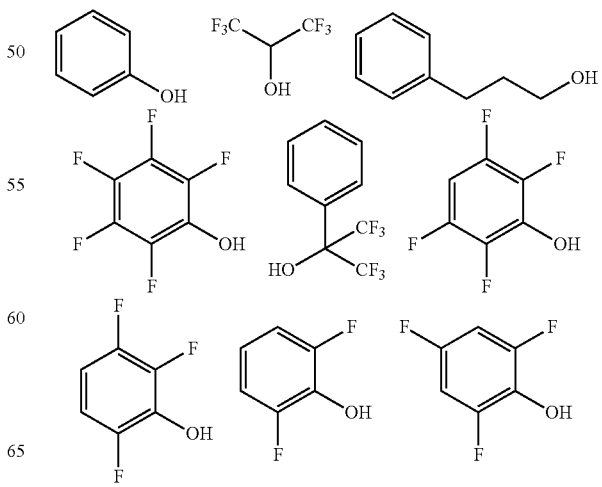

-continued

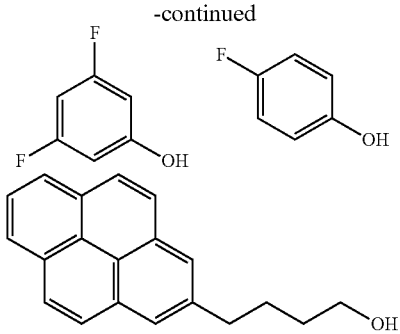

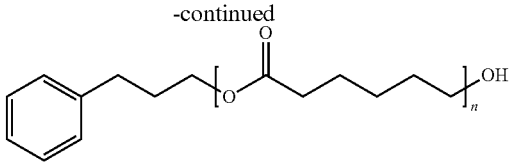

By way of example, the initiator may be the alcohol 3-phenyl-1-propanol.

As described previously, the initiator will be integrated at the chain end of the polymer intended for forming the side chains of the comb polymer according to the invention.

The ring-opening polymerization reaction of the monomers of the lactone or carbonate cyclic type may advantageously be catalyzed, for example by a catalyst selected from substituted phosphorus compounds such as diphenyl phosphate (DPP) or alternatively by compounds of the metallic type such as tin diethylhexanoate (Sn(Oct)$_2$).

A person skilled in the art is capable of adjusting the operating conditions of the polymerization reaction in order to obtain the desired polymers which are intended for forming the polymeric side chains of the comb polymer according to the invention and have a free hydroxyl function at one of the extremities thereof. The ROP reaction may for example be carried out at a temperature of between 20 and 110° C., in particular between 40 and 80° C. The reaction may be performed with stirring in a solvent medium, for example in one or more apolar and aprotic solvents, such as toluene, or without solvent.

The ROP reactions for synthesizing polymers intended for forming the side chains of the comb polymer according to the invention of the poly(trimethylene carbonate) and poly(ε-caprolactone) type from cyclic carbonate monomers of the trimethylene carbonate and ε-caprolactone type and using the alcohol 3-phenyl-1-propanol as initiator are shown by way of example below.

[Chem 19]

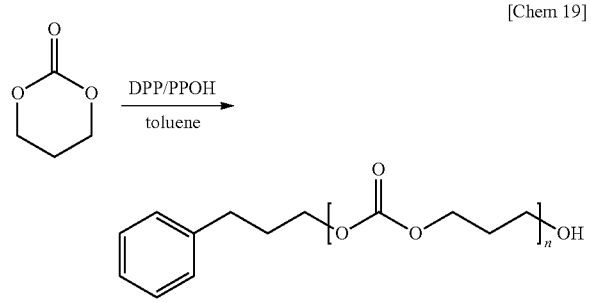

[Chem 20]

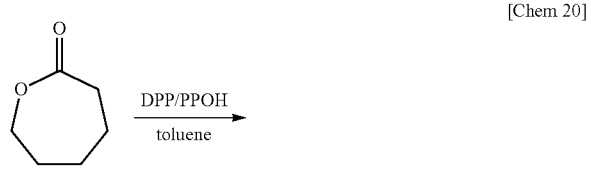

The polymers intended for forming the polymeric side chains, in particular of the above-stated formula (IV) or (IV'), are capable of being grafted in the para position of the pentafluorophenyl groups of the monomer units of the PPFS type chain, by a nucleophilic substitution reaction, also known as a reaction of the "para click" type, between the hydroxyl function borne by said polymers and the fluorine atom in the para position of the pentafluorophenyl groups of the monomer units of the PPFS type chain. The nucleophilic substitution reaction is regioselective, namely only the fluorine atom in the para position of the pentafluorophenyl group is substituted.

These nucleophilic substitution reactions of the para click type are described for example by Delaittre et al. [1].

The reaction may be more particularly be carried out in a basic solvent medium, typically formed of one or more polar aprotic solvent(s), in particular selected from tetrahydrofuran (THF), amides such as N,N-dimethylacetamide (DMAc), N,N-dimethylformamide (DMF), N-methyl-2-pyrrolidone (NMP); methyl ethyl ketone (MEK), N-methyl-2-pyrrolidone and mixtures thereof, preferably in tetrahydrofuran (THF), to which is added at least one strong base, for example an alkali metal hydroxide which may especially be sodium or potassium hydroxide.

It is the responsibility of a person skilled in the art to adjust the operating conditions for carrying out the "para click" type reaction for grafting the polymeric side chains, especially with regard the desired grafting rate.

In particular, the grafting reaction may be carried out at temperatures of between 50° C. and 150° C. and in particular between 66° C. and 100° C. The duration of the reaction may be between 12 hours and 72 hours and in particular between 24 hours and 48 hours.

By way of example, the mixture, which comprises the polymer intended for forming the side chains of the comb polymer according to the invention, and the PPFS type polymer intended for forming the main chain of the comb polymer according to the invention may be refluxed in the basic solvent medium with stirring.

According to another variant embodiment, the polymeric side chains may be formed by carrying out the polymerization of the side chains directly at the level of the PPFS type polymer.

For the purposes of this variant embodiment, the formation of the polymeric side chains in step (ii) of the method of the invention may comprise at least the following steps:
  (a) substituting the fluorine atoms in the para position of the pentafluorostyrene groups of a proportion of the monomer units of the PPFS type polymer by groups bearing a free hydroxyl function (—OH); and
  (b) contacting said PPFS type polymer functionalized in this manner by pendant hydroxyl functions with precursor monomers of the polymeric side chain under conditions favorable to the polymerization of said monomers.

More particularly, in a first step (a), a proportion of the monomer units of the PPFS type polymer is modified in order to graft pendant hydroxyl functions (—OH) in the para position of the pentafluorostyrene groups.

The monomer units may more particularly be functionalized with hydroxyl functions by a nucleophilic substitution reaction of the "para click" type as described previously, in particular by reacting the PPFS type polymer intended for forming the main chain of the comb polymer according to the invention with an alkali metal hydroxide, especially of sodium or potassium, and preferably with potassium hydroxide (KOH) or alternatively with a compound of the diol type bearing two free hydroxyl functions (—OH).

The compound of the diol type is of the formula HO-E-OH, with E representing a $C_1$ to $C_6$ alkylene group. It may be, for example, methanediol or ethylene glycol.

In a second step (b), the polymeric side chains are polymerized directly in the para position of the pentafluorostyrene groups para-functionalized by pendant hydroxyl functions by placing the modified polymer obtained on completion of step (a) in the presence of precursor monomers of said polymeric side chain under conditions favorable to the polymerization of said monomers.

It is the responsibility of a person skilled in the art to adjust the operating conditions for performing the polymerization of the desired pendant side chains. Polymerization is thus typically carried out in the presence of at least one catalyst, for example of the alkaline type, such as sodium or potassium hydroxide or sodium carbonate, for growth of POE chains, or alternatively a phosphorus catalyst, such as DPP, for ring-opening polymerization of lactone or cyclic carbonate type monomers, for example for the formation of pendant side chains of the PTMC or PCL type.

The resultant side chains are then subjected to a termination reaction, in particular to terminate the grafted chains with R groups as described previously.

It goes without saying that a person skilled in the art is capable of adjusting the synthesis conditions, in particular according to one or the other of the above-stated variants, in order to obtain a comb polymer having the desired properties, in particular as described previously.

In particular, the proportions of said PPFS type polymer intended for forming the main chain of the comb polymer according to the invention and of the polymer or said precursor monomers intended for forming said polymeric side chains, are preferably adjusted so as to obtain the desired molar grafting rate of polymeric side chains, preferably of between 50 and 95%.

The comb polymer obtained on completion of the grafting reaction of the polymers intended for forming the polymeric side chains, in particular the solvating polymers, on the monomer units of the PPFS type polymer may be subjected to one or more purification steps, for example by precipitation in ether and then in water.

The polymeric material obtained, formed of the comb polymers according to the invention, advantageously assumes solid elastic form at ambient temperature. More particularly the comb polymers according to the invention are arranged in the form of a three-dimensional network of entangled polymers and exhibit viscoelastic behavior, revealed by the existence of a rubbery plateau, in particular at temperatures of greater than −50° C.

Solid Electrolyte

As mentioned previously, the comb polymers according to the invention, in particular having side chains based on solvent polymers of salts of an alkali metal or alkaline-earth metal (solvating polymers), may be used, in combination with at least one ionic salt, in order to form a solid electrolyte, in particular in an electrochemical system, especially in a lithium battery.

Another aspect of the invention accordingly relates to a solid polymer electrolyte comprising at least one comb polymer according to the invention, as defined previously, in particular having side chains based on solvating polymers, and at least one salt of an alkali metal or alkaline-earth metal. In particular, the polymer electrolyte according to the invention may be formed of at least one comb polymer according to the invention and at least one salt of an alkali metal or alkaline-earth metal.

In particular, the polymer network formed of the comb polymers according to the invention forms more than 50 mass %, in particular more than 75 mass %, of the total mass of said solid electrolyte.

Advantageously, the solid polymer electrolyte film according to the invention contains no plasticizers such as carbonates, for example ethylene carbonate or diethyl carbonate.

In particular, the film of solid electrolyte according to the invention differs from a gelled type electrolyte comprising a majority proportion of plasticizer.

Preparation of the Solid Electrolyte According to the Invention

According to another of the aspects thereof, the invention also relates to a method for the preparation of a film of solid electrolyte, comprising at least the following steps:

(i) mixing at least one comb polymer according to the invention as previously described, in particular having polymeric side chains based on solvating polymers, and at least one salt of an alkali metal or alkaline-earth metal in the presence or absence of a solvent medium; and (ii) forming, in particular on the surface of a substrate, a film from said mixture.

The film is more particularly formed on the surface of a suitable substrate, in particular which is inert under the conditions of forming the solid electrolyte film, then optionally detached from said substrate in order to be used in the electrochemical system for which it is intended, in particular to be transferred onto at least one electrode.

The substrate may be of various kinds. It may be of glass, alumina, silicone, polyimide, polytetrafluoroethylene (PTFE), polyethylene terephthalate (PET), silicone or alternatively polypropylene.

The salt of an alkali metal or alkaline-earth metal is used with the comb polymer according to the invention to ensure ion conduction.

For the purposes of the invention:

"alkali metals" are taken to mean the chemical elements of the first column of the periodic table of elements, and more particularly selected from lithium, sodium, potassium, rubidium and cesium. The alkali metal is preferably lithium, sodium or potassium, and more preferably lithium;

"alkaline-earth metals" are taken to mean the chemical elements of the second column of the periodic table of elements, and more particularly selected from beryllium, magnesium, calcium, strontium, barium and radium. The alkaline-earth metal is preferably magnesium or calcium.

The alkali metal salt may be for example a lithium salt or a sodium salt; the alkaline-earth metal salt may be for example a magnesium salt.

Examples of lithium salts which may be mentioned are $LiPF_6$, $LiClO_4$, $LiBF_4$, $LiAsF_6$, $LiCF_3SO_3$, $LiN(C_2F_5SO_2)_2$, lithium bis(trifluoromethylsulfonyl)imide $LiN[SO_2CF_3]_2$ (known under the abbreviation LiTFSI), lithium bis(fluorosulfonyl)amide (known under the abbreviation LiFSI) LiN

[SO$_2$F]$_2$, lithium 4,5-dicyano-2-(trifluoromethyl)imidazole (known under the abbreviation LiTDI), lithium bis(pentafluoroethylsulfonyl)imide (known under the abbreviation LiBETI), lithium bis(oxalato)borate (known under the abbreviation LiBOB) and lithium difluoro(oxalato)borate (known under the abbreviation LiFOB) and mixtures thereof.

Preferably, the electrolyte comprises LiTFSI or LiFSI and preferably LiTFSI.

It is the responsibility of a person skilled in the art to adjust the quantity of salts of an alkali metal or alkaline-earth metal, especially with regard to the kind of comb polymer, and especially of the kind of polymeric side chains borne by the comb polymer, used according to the invention.

Where a comb polymer bearing side chains of the polyalkylene glycol, in particular polyethylene glycol, type is used, the quantities of comb polymers according to the invention and lithium salt(s) may advantageously be adjusted such that the O/Li ratio molar is between 6 and 24, advantageously between 8 and 16, in particular between 14 and 16 and more particularly approximately 16.

Where a comb polymer bearing side chains formed from monomers of the lactone, in particular poly(ε-caprolactone), type is used, the quantities of comb polymers according to the invention and lithium salt(s) may advantageously be adjusted such that the CO$_2$/Li ratio molar is between 0.5 and 20, advantageously between 1 and 5, in particular between 1 and 3 and more particularly approximately 1.

Where a comb polymer bearing side chains formed from monomers of the cyclic carbonate, in particular poly(trimethylene carbonate), type is used, the quantities of comb polymers according to the invention and lithium salt(s) may advantageously be adjusted such that the CO$_3$/Li ratio molar is between 0.5 and 20, advantageously between 1 and 5, in particular between 1 and 3 and more particularly approximately 1.

Mixing of the comb polymer according to the invention and said salt of an alkali metal or alkaline-earth metal is more particularly carried out under conditions which enable good dispersion of said salt of an alkali metal or alkaline-earth metal at the level of the polymer network formed of the comb polymers according to the invention. Mixing may be carried out in the presence or absence of a solvent.

A solid electrolyte film according to the invention may thus be prepared either by the route using a solvent medium (hereafter denoted "solvent route") or by the route using the polymer in the molten state and in the absence of solvent (hereafter denoted "molten route").

According to a first variant embodiment, the solid electrolyte film is prepared by the "solvent" route.

For the purposes of this variant, mixing of said comb polymer according to the invention and the salt of an alkali metal or alkaline-earth metal in step (i) is more particularly carried out in a solvent medium. The solvent medium may be formed of one or more polar organic solvents.

By way of example, these may be selected from acetone, tetrahydrofuran (THF) and mixtures thereof.

The mixture is preferably heated in step (i) to a temperature of less than 100° C. In particular, mixing is carried out at a temperature greater than or equal to 25° C. and in particular of between 40 and 60° C.

The solid electrolyte film is then formed in step (ii) via at least the steps consisting in (ii-a) depositing the formulation of step (i) on the surface of the substrate, for example by coating, and (ii-b) evaporating said solvent(s) under conditions favorable to the formation of a dry solid film.

"Dry" is taken to mean that the film comprises less than 5 mass % of solvent, in particular less than 2 mass % and more particularly less than 1 mass % of solvent.

This synthesis route has the advantage of being simple to use and of not requiring sophisticated equipment. However, when it is intended to be carried out on a large scale, this route poses management issues with regard to the volumes of solvent used and the safety problems inherent to solvent vapors.

According to another variant embodiment, the solid electrolyte film is prepared in the absence of solvent using the "molten" route, especially by extrusion.

For the purposes of this variant embodiment, mixing may more particularly be carried out by heating to a temperature of greater than $T_g+30°$ C., where $T_g$ is the glass transition temperature of the comb polymer.

In particular, mixing is carried out at a temperature greater than or equal to −40° C. and in particular of between 20 and 80° C.

The mixture in the molten state may then be converted into film form, either supported by a substrate or self-supporting, by any molten route extrusion technique known to a person skilled in the art.

Electrochemical System

The solid electrolyte according to the invention may be used in an electrochemical system, for example for a lithium battery.

According to still another of the aspects thereof, the present invention accordingly also relates to an electrochemical system comprising a solid electrolyte according to the invention.

The electrochemical system may be an electrochemical generation, conversion or storage system. It may more particularly be a fuel cell, for example a proton-exchange membrane fuel cell (PEMFC); a primary or secondary battery, for example a lithium, sodium, magnesium, potassium or calcium battery; or a lithium-air or lithium-sulfur storage battery. According to one particular embodiment, the solid electrolyte is used in a battery, in particular a lithium battery and especially a lithium-ion or lithium-metal battery.

The solid electrolyte according to the invention may more particularly be used as a separator electrolyte within an electrochemical system. A "separator electrolyte" is taken to mean a solid electrolyte film positioned between the positive and negative electrodes of an electrochemical system and acting simultaneously as an ion conductor and a separator between the positive and negative electrodes.

Producing the desired electrochemical system incorporating the separator electrolyte according to the invention is within the capabilities of a person skilled in the art. In particular, the assembly formed of the electrodes and the film of solid separator electrolyte may be obtained by assembling the various elements and hot pressing, for example at a temperature of between 25 and 150° C.

The solid electrolyte film may have a thickness of between 1 and 100 µm, in particular between 5 and 50 µm and more particularly of approximately 15 µm.

By way of example, a lithium storage battery may be formed, in conventional manner, by two electrodes, namely a positive electrode and a negative electrode.

The positive electrode generally comprises, as the electrochemically active material, lamellar compounds such as LiCoO$_2$, LiNiO$_2$ and mixed compounds Li(Ni, Co, Mn, Al)O$_2$, or compounds of a spinel structure of compositions close to LiMn$_2$O$_4$ and lithium phosphates, in particular LiFePO$_4$.

The negative electrode generally comprises, as the electrochemically active material, metallic lithium in the case of primary storage batteries, or intercalation materials such as graphite carbon, or lithiated titanium oxide ($Li_4Ti_5O_{12}$) in the case of storage batteries based on lithium-ion technology.

current collectors, generally of copper for the negative electrode, or of aluminum for the positive electrode, which enable the circulation of electrons, and hence electron conduction, in the external circuit.

Preferably, the current collector for the positive electrode is made of aluminum protected from corrosion due to the lithium salt, for example of aluminum covered with a carbon-filled polymer layer.

the solid polymer electrolyte according to the invention which is the location of the ion conduction which ensures the passage of lithium ions from one electrode to the other, and which also plays the part of a separator preventing contact between the positive and negative electrodes.

This may in particular be a lithium-metal battery comprising a metallic lithium anode and a cathode comprising at least one positive electrode active substance between which is located a solid electrolyte according to the invention.

The invention will now be described by means of the following examples and figures which are, of course, provided to illustrate rather than limit the invention.

EXAMPLE

Example 1

Preparation of the Comb Polymer poly(2,3,4,5,6-pentafluorostyrene) Bearing poly(ethylene oxide) Grafts ("PPFS$_{49k}$-g-POE$_{0.35k}$")

495 mg of poly(2,3,4,5,6-pentafluorostyrene) (denoted PPFS) of a number-average molecular mass of 49 kg·mol$^{-1}$; 5.078 g of POE monomethyl ether of 350 g·mol$^{-1}$ and 380 mg of KOH are added to 20 ml of tetrahydrofuran (THF). The medium is stirred and refluxed for 24 hours. The medium is then precipitated in ether and then in water in order to obtain a viscous, violet-colored polymer.

NMR $^1$H: (400 MHz; THF-d$_8$; 298 K): δ ppm 2.1; 2.5; 2.9; 3.3; 3.5; 3.8

NMR $^{19}$F: (400 MHz; THF-d$_8$; 298 K): δ ppm −144; −158; −164

On the basis of the fluorine NMR spectra, the POE pendant chain grafting rate is greater than 75%.

FIG. 1 shows the infrared spectra of PPFS and the PPFS$_{49k}$-g-POE$_{0.35k}$ comb polymer.

Preparation of the Electrolyte and Electrochemical Properties

The viscous polymer (201.9 mg) is mixed with lithium salt LiTFSI (46.1 mg) in anhydrous acetone at 56° C.

After evaporation followed by drying, the solid electrolyte is deposited onto a sheet of metallic lithium and incorporated into a symmetrical Li/electrolyte/Li button cell for the determination of the electrochemical properties thereof. The experiment is reproduced for three identical button cells.

FIG. 2 shows the variation in ion conductivity as a function of temperature.

Electrochemical testing is performed by galvanostatic cycling at different current densities per 4 hour plateau at a temperature of 40° C.

FIG. 3 shows the cycling curves obtained with the electrolyte based on the PPFS$_{49k}$-g-POE$_{0.35k}$ comb polymer.

Electrochemical behavior is also evaluated by impedance spectroscopy. FIG. 4 shows the Nyquist diagrams obtained after cycling for variable current densities. They indicate to good stability of the solid electrolyte/lithium interfaces during cycling and reversible electrodeposition of homogeneous metallic lithium on the surface of the electrode during cycling.

Example 2

Preparation of poly(2,3,4,5,6-pentafluorostyrene) Comb Polymers Bearing poly(ethylene oxide) Grafts ("PPFS-g-POE")

2.1. Synthesis of Comb Polymer PPFS$_{49}$-g-POE$_{0.75k}$ 1.5 mg of PPFS (49 kg·mol$^{-1}$), 11.5 g of POE monomethyl ether (750 g·mol$^{-1}$) and 500 mg of KOH are added to 50 ml of THF. The medium is stirred and refluxed for 48 hours. The medium is then precipitated in ether and then in water in order to obtain a solid exhibiting rubber-type viscoelastic behavior.

2.2. Synthesis of Comb Polymer PPFS$_{39k}$-g-POE$_{0.35k}$ 1.504 g of PPFS (39 kg·mol$^{-1}$), 5.460 g of POE monomethyl ether (350 g·mol$^{-1}$) and 583 mg of KOH are added to 50 ml of THF. The medium is stirred and refluxed for 48 hours. The medium is then precipitated in water in order to obtain a violet-colored polymer exhibiting rubber-type viscoelastic behavior.

2.3. Synthesis of Comb Polymer PPFS$_{39k}$-g-POE$_{0.75k}$ 1.5006 g of PPFS (39 kg·mol$^{-1}$), 11.712 g of POE monomethyl ether (750 g·mol$^{-1}$) and 562 mg of KOH are added to 70 ml of THF. The medium is stirred and refluxed for 48 hours. The medium is then precipitated in ether and then in water in order to obtain a violet-colored polymer exhibiting rubber-type viscoelastic behavior.

Preparation of the Electrolyte and Electrochemical Properties

After physically mixing these polymers (in a glass vial) with LiTFSI (172.6 mg of PPFS$_{49k}$-g-POE$_{0.75k}$+32.1 mg of LiTFSI; 203.2 mg of PPFS$_{39k}$-g-POE$_{0.35k}$+41.3 mg of LiTFSI; 198.3 mg of PPFS$_{39k}$-g-POE$_{0.75k}$+38.3 mg of LiTFSI) in hot acetone (56° C.), evaporation of the solvent followed by drying, the electrolytes obtained are shaped (using a hot press (100° C.) in the case of the solids), and then introduced into a symmetrical shim (stainless steel)/electrolyte/shim (stainless steel) button cell to determine the conductivity thereof by EIS ("electrochemical impedance spectroscopy").

FIG. 5 shows the variation in ion conductivity as a function of temperature for the electrolytes prepared in examples 1 and 2.

FIG. 6 shows the contribution of the Li$^+$ ion to ion conductivity. This contribution may be evaluated on the basis of the Li$^+$ ion transport number, denoted $t_{Li+}$, according to the equation $\sigma_{Li+}=\sigma \times t_{Li+}$, where $\sigma_{Li+}$ is the conductivity of the Li$^+$ ion and σ total conductivity.

An electrolyte's lithium transport number electrolyte may be determined using the method known from Bruce and Vincent. It depends especially on the kind of polymeric side chains used in the comb polymer of the invention.

Example 3

Preparation of poly(2,3,4,5,6-pentafluorostyrene) Comb Polymers Bearing poly(trimethylene carbonate) Grafts ("PPFS-g-PTMC")

3.1. Synthesis of Comb Polymer $PPFS_{49k}$-g-$PTMC_{5k}$ 100 mg of PPFS (49 kg·mol$^{-1}$), 3 g of PTMC (5 g·mol$^{-1}$) and 380 mg of KOH are added to 20 ml of THF. The medium is stirred and refluxed for 24 hours. The medium is then precipitated and then purified by semi-preparative steric exclusion chromatography.

3.2. Synthesis of Comb Polymer $PPFS_{39k}$-g-$PTMC_{2.2k}$ 495 mg of PPFS (39 kg·mol$^{-1}$), PTMC (2,200 g·mol$^{-1}$) 380 mg of KOH are added to 20 ml of THF. The medium is stirred and refluxed for 24 hours. The medium is then precipitated and then purified by semi-preparative steric exclusion chromatography.

Preparation of the Electrolyte and Electrochemical Properties

After physically mixing these polymers with LiTFSI in hot acetone (641 mg of $PPFS_{49k}$-g-$PTMC_{5k}$+136.3 mg of LiTFSI; 275.5 mg of $PPFS_{39k}$-g-$PTMC_{2.2k}$+55.4 mg of LiTFSI) (56° C.), evaporation and then drying, the electrolytes obtained are introduced into a symmetrical shim (stainless steel)/electrolyte/shim (stainless steel) button cell to determine the conductivity thereof by EIS ("electrochemical impedance spectroscopy").

FIG. 7 shows the variation in ion conductivity as a function of temperature for the electrolytes based on the $PPFS_{49k}$-g-$PTMC_{5k}$ and $PPFS_{39k}$-g-$PTMC_{2.2k}$ comb polymers according to the invention. By way of comparison, the variation in ion conductivity as a function of temperature for electrolytes based on $PTMC_{2.4k}$ and $PTMC_{5k}$ is also shown. FIG. 8 shows the contribution of the Li$^+$ ion to ion conductivity, evaluated on the basis of the Li$^+$ ion transport number.

Example 4

Preparation of poly(2,3,4,5,6-pentafluorostyrene) Comb Polymers Bearing poly(ethylene oxide) Grafts ("PPFS-g-PEO")

4.1. Synthesis of $PPFS_{170k}$-g-$PEO_{0.35k}$

PPFS ($M_n$=170 kg·mol$^{-1}$, $D_w$=5.2, 1 equivalent of PFS units), PEO methyl ether (350 g·mol$^{-1}$, 1.1 equivalents) and KOH (1.1 equivalents) are dissolved in THF; the medium is stirred at reflux for 48 hours. At the end of the reaction, the reaction medium is precipitated from water. The THF is evaporated off on a rotary evaporator to limit the solubility of the product in the precipitation medium. The solution is subsequently cooled and then centrifuged to separate the water from the product. The supernatant is then discarded. This operation is repeated three times. After drying (at 100° C. for a minimum of 48 hours under a primary dynamic vacuum (P≈10$^{-1}$ mbar)), the comb copolymer is obtained in the form of a rubbery violet-colored solid.

$^1$H NMR (THF-d$_5$): δ=2.0 ppm (s, 2H, (Ar)CH—CH$_2$—); 2.5-2.8 ppm (1H, (Ar)CH—CH$_2$—); 1.9 ppm (s, 3H, O—CH$_3$); 3.6 ppm (4H, O—CH$_2$CH$_2$—O); 3.8 ppm (2H, CH$_2$CH$_2$—O—CH$_3$); 4.3 ppm (2H, Ar—O—CH$_2$)

$^{19}$F NMR (THF-d$_5$): δ=−144 ppm (ortho aromatics); −158 ppm (para+meta aromatic of grafted units); −164 ppm (meta aromatics of the non-grafted units)

4.2. Synthesis of $PPFS_{170k}$-g-$PEO_{0.55k}$

PPFS ($M_n$=170 kg·mol$^{-1}$, $D_w$=5.2, 1 equivalent of PFS units), PEO methyl ether (550 g·mol$^{-1}$, 1.1 equivalents) and KOH (1.1 equivalents) are dissolved in THF; the medium is stirred at reflux for 48 hours. At the end of the reaction, the reaction medium is precipitated from water. The THF is evaporated off on a rotary evaporator to limit the solubility of the product in the precipitation medium. The solution is subsequently cooled and then centrifuged to separate the water from the product. The supernatant is then discarded. This operation is repeated three times. After drying (at 100° C. for a minimum of 48 hours under a primary dynamic vacuum (P≈10$^{-1}$ mbar)), the comb copolymer is obtained in the form of a rubbery violet-colored solid.

4.3. Synthesis of $PPFS_{170k}$-g-$PEO_{0.75k}$

PPFS ($M_n$=170 kg·mol$^{-1}$, $D_w$=5.2, 1 equivalent of PFS units), PEO methyl ether (750 g·mol$^1$, 1.1 equivalents) and KOH (1.1 equivalents) are dissolved in THF; the medium is stirred at reflux for 48 hours. At the end of the reaction, the reaction medium is precipitated from water. The THF is evaporated off on a rotary evaporator to limit the solubility of the product in the precipitation medium. The solution is subsequently cooled and then centrifuged to separate the water from our product. The supernatant is then discarded. This operation is repeated three times. After drying (at 100° C. for a minimum of 48 hours under a primary dynamic vacuum (P≈10$^{-1}$ mbar)), the comb copolymer is obtained in the form of a rubbery violet-colored solid.

Preparation of the Electrolytes Based on PPFS-g-PEO/LiTFSI and Electrochemical Properties The electrolytes are prepared in a glovebox. The polymer and the salt are weighed out in the desired proportions ([LITFSI]=20% by mass), and are then dissolved in acetone and mixed. The acetone is then evaporated off, and the electrolyte is then dried at 100° C. under a primary dynamic vacuum (P≈10$^{-1}$ mbar) for a minimum of 48 hours. To extract the last traces of water, the electrolyte is dried for one hour at 110° C. under a stream of argon.

The electrolytes obtained are formed (using a hot press in the case of the solids) and then introduced into a button cell (in blocking configuration) to determine their conductivity by EIS ("Electrochemical Impedance Spectroscopy").

FIG. 9 represents the change in conductivity as a function of the temperature for the electrolytes PPFS-g-PEO/LiTFSI based on the comb polymers $PPFS_{170k}$-g-$PEO_{0.35k}$, $PPFS_{170k}$-g-$PEO_{0.55k}$ and $PPFS_{170k}$-g-$PEO_{0.75k}$ according to the invention.

FIGS. 10, 11 and 12 show the galvanostatic cycling characterizations (GCPL) performed in a symmetrical button cell (Li/Li) for the electrolytes PPFS-g-PEO/LiTFSI and the associated EIS monitoring.

FIG. 13 shows the cycling in a full Li/LFP cell, the formulation of the positive electrode of which is detailed in Table 1.

TABLE 1

| Materials | Composition (mass %) |
|---|---|
| LiFePO$_4$ (LFP) | 70 |
| Carbon black (KB600) | 2 |
| PVDF | 4 |
| Electrolyte ([LiTFSI] = 20% by mass) | 24 |

Example 5

Preparation of poly(2,3,4,5,6-pentafluorostyrene) Comb Polymers Bearing Poly(trimethylene carbonate) Grafts ("PPFS-g-PTMC")

5.1. Synthesis of PPFS$_{33k}$-g-PTMC$_{1.5k}$

PTMC ($M_n$=1.5 kg·mol$^{-1}$, $D_w$=1.1, 1.1 equivalents) is dissolved in THF, followed by addition of KOH (1.1 equivalents), and then addition of a solution of PPFS ($M_n$=33 kg·mol$^{-1}$, $D_w$=1.9, 1 equivalent) in THF. The reaction medium is refluxed for 48 hours. At the end of the reaction, the reaction medium is precipitated a first time from water to remove the salt (KF), the reaction byproduct. Preparative SEC is used to purify the product. After drying (at 80° C. for a minimum of 48 hours under a primary dynamic vacuum (P≈10$^{-1}$ mbar)), the comb copolymer is obtained in the form of a white solid.

5.2. Synthesis of PPFS$_{33k}$-g-PTMC$_{1.9k}$

PTMC ($M_n$=1.9 kg·mol$^{-1}$, $D_w$=1.1, 1.1 equivalents) is dissolved in THF, followed by addition of KOH (1.1 equivalents), and then addition of a solution of PPFS ($M_n$=33 kg·mol$^{-1}$, $D_w$=1.9, 1 equivalent) in THF. The reaction medium is refluxed for 48 hours. At the end of the reaction, the reaction medium is precipitated a first time from water to remove the salt (KF), the reaction byproduct. Preparative SEC is used to purify the product. After drying (at 80° C. for a minimum of 48 hours under a primary dynamic vacuum (P≈10$^{-1}$ mbar)), the comb copolymer is obtained in the form of a transparent molten polymer which crystallizes slowly over time (at room temperature).

Preparation of the Electrolytes PPFS-g-PTMC/LiTFSI

The electrolytes are prepared in a glovebox. The polymer and the salt are weighed out in the desired proportions ([LiTFSI]=20% by mass), and are then dissolved in acetone and mixed. The acetone is then evaporated off, and the electrolyte is then dried at 80° C. under a primary dynamic vacuum (P≈10$^{-1}$ mbar) for a minimum of 48 hours. To extract the last traces of water, the electrolyte is dried for one hour at 110° C. under a stream of argon.

PPFS-g-PTMC/LiTFSI Electrochemical Characterizations

Once dry, the electrolytes obtained are formed (using a hot press in the case of the solids) and then introduced into a button cell (in blocking configuration) to determine their conductivity by EIS ("Electrochemical Impedance Spectroscopy").

FIG. 14 represents the change in the conductivity of the electrolytes PPFS-g-PTMC/LiTFSI ([LiTFSI]=20% by mass) as a function of the temperature.

FIG. 15 shows the GCPL characterization performed in a symmetrical button cell (Li/Li) for the electrolyte PPFS$_{33k}$-g-PTMC$_{1.5k}$/LiTFSI and the associated EIS monitoring.

FIG. 16 shows the cycling in a full Li/NMC622 cell, the formulation of the positive electrode of which is detailed in Table 2.

TABLE 2

| Materials | Composition (mass %) |
|---|---|
| LiNi$_{0.6}$Mn$_{0.2}$Co$_{0.2}$O$_2$ (NMC622) | 70 |
| Carbon black (KB600) | 2 |
| PVDF | 4 |
| Electrolyte ([LiTFSI] = 20% by mass) | 24 |

LIST OF CITED DOCUMENTS

[1] Delaittre et al., Polym. Chem. 2018, 9, 2679-2684;
[2] Bates et al., Macromolecules 2015, 48, 4967-4973;
[3] Li et al., Macromolecules 2019, 52, 7234-7243;
[4] Makiguchi et al., Macromolecules 2011, 44, 1999-2005;
[5] Ott et al., Chem. Commun., 2008, 3516-3518;
[6] Cai et al., Polym. Chem., 2012, 3, 1061-1068;
[7] Powell et al., Macromolecules 2007, 40, 4509-4515;
[8] Pollack et al., ACS Appl. Mater. Interfaces 2014, 6, 19265-29274;
[9] Jankova K., Hvilsted S. Macromolecules, 36, 1753-1758, 2003.
[10] Senniger Thierry, Catalyse de polymérisation, 1998;
[11] Soga, K. et al., Prog. Polym. Sci. 22, 1503-1546, 1997;
[12] Huang, J. et al., Prog. Polym. Sci. 20, 459-526, 1995.

The invention claimed is:

1. A comb polymer comprising a main chain consisting of monomeric units formed from 1-ethenyl- and/or 1-allyl-2,3,4,5,6-pentafluorobenzene monomers and polymeric side chains grafted in a para position of pentafluorophenyl groups,
wherein the polymeric side chains are linked to the main chain by an oxygen atom, and the polymeric side chains have a molar grafting rate of greater than or equal to 50%, and
wherein the main chain has a number-average degree of polymerization of greater than or equal to 50.

2. The comb polymer of claim 1, wherein the molar grafting rate of polymeric side chains is less than or equal to 99%.

3. The comb polymer of claim 1, wherein the main chain is formed of a poly(2,3,4,5,6-pentafluorostyrene).

4. The comb polymer of claim 1, wherein the polymeric side chains have a number-average degree of polymerization of greater than or equal to 4.

5. The comb polymer of claim 1, wherein the comb polymer has grafted monomer units of formula (I'):

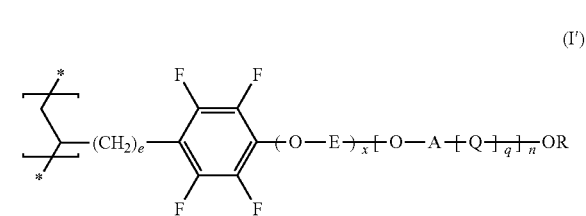

wherein:
e is 0 or 1;
x is 0 or 1;
E represents a $C_1$ to $C_6$ alkylene group;
A represents a linear or branched $C_2$ to $C_{11}$ alkylene group;
Q represents an oxycarbonyl —OC(O)— or carbonyl —C(O)— group;
q is 0 or 1;
n is a positive integer; and
R represents a non-reactive group.

6. The comb polymer of claim 1, wherein the comb polymer is formula (II'):

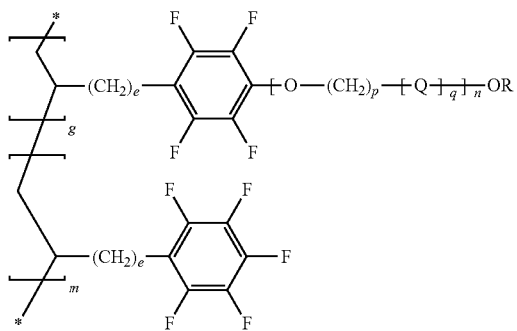

wherein
e is 0 or 1;
p is an integer between 2 and 11;
q is 0 or 1;
Q represents an oxycarbonyl —OC(O)— or carbonyl —C(O)— group;
n is a positive integer;
R represents a non-reactive group;
g corresponds to an average number of monomer units bearing the polymeric side chains; and
m corresponds to an average number of ungrafted monomer units;
with g/(g+m), which represents a molar grafting rate of polymeric side chains, being greater than or equal to 0.50 and less than or equal to 0.99;
an order of succession of two types of monomer units forming the polymer of the formula (II') being completely random.

7. The comb polymer of claim 1, wherein the side chains are polyalkylene glycol chains; or are formed from at least one cyclic monomer selected from the group consisting of five- to eight-membered lactones and cyclic carbonates.

8. The comb polymer of claim 5, wherein R represents a linear or branched alkyl group which is optionally substituted by fused or unfused, saturated or unsaturated or aromatic or non-aromatic mono- or polycyclic or mono- or polyheterocyclic groups; or a fused or unfused, saturated or unsaturated or aromatic or non-aromatic mono- or polycyclic or mono- or poly(hetero)cyclic group; the alkyl group and/or the mono- or poly(hetero)cyclic group(s) optionally being substituted by one or more fluorine atoms.

9. The comb polymer of claim 7, wherein the side chains are poly(ethylene oxide) chains or of the poly(trimethylene carbonate) or poly(ε-caprolactone) type.

10. A method for preparing a comb polymer, comprising a main chain formed from 1-ethenyl- and/or 1-allyl-2,3,4,5,6-pentafluorobenzene monomers and polymeric side chains grafted in a para position of pentafluorophenyl groups, wherein the polymeric side chains are linked to the main chain by an oxygen atom, and the polymeric side chains have a molar grafting rate of greater than or equal to 50%, the method comprising:
(i) providing a polymer formed from 1-ethenyl- and/or 1-allyl-2,3,4,5,6-pentafluorobenzene monomers, known as PPFS type polymer, intended for forming the main chain of the comb polymer; and
(ii) forming the polymeric side chains in a para position of a proportion of the pentafluorophenyl groups of the monomer units of the PPFS type polymer.

11. The method of claim 10, wherein the PPFS type polymer in the providing is formed by polymerization from a mixture of a Ziegler-Natta type catalytic system comprising a catalyst and a co-catalyst and of 1-ethenyl- and/or 1-allyl-2,3,4,5,6-pentafluorobenzene monomers.

12. The method of claim 10, wherein the side chains are formed in the forming by grafting previously synthesized polymers intended for forming the polymeric side chains of the comb polymer in the para position of a proportion of the pentafluorophenyl groups of the monomer units of the PPFS type polymer.

13. The method of claim 12, wherein the polymeric side chains are formed in the forming by contacting the PPFS type polymer with at least one polymer which is intended for forming the polymeric side chains of the comb polymer and has at one of extremities thereof a free hydroxyl function under conditions favorable to grafting the polymer in the para position of a pentafluorophenyl group.

14. The method of claim 10, wherein the side chains are formed in the forming by carrying out the polymerization of the side chains directly at the level of the PPFS type polymer.

15. The method of claim 14, wherein the forming comprises:
(a) substituting fluorine atoms in the para position of the pentafluorostyrene groups of a proportion of the monomer units of the PPFS type polymer by groups bearing a free hydroxyl function; and
(b) contacting the PPFS type polymer functionalized in this manner by pendant hydroxyl functions with precursor monomers of the polymeric side chain under conditions favorable to the polymerization of the monomers.

16. The method of claim 15, wherein the polymeric side chains are formed in the forming by a nucleophilic substitution reaction of a para click type between the hydroxyl function borne by the polymer and a fluorine atom in the para position of the pentafluorophenyl group.

* * * * *